(12) United States Patent
Ratilla

(10) Patent No.: US 11,307,564 B2
(45) Date of Patent: Apr. 19, 2022

(54) METHODS, SYSTEMS AND COMPUTER PROGRAM PRODUCTS FOR PLANT RESOURCE MANAGEMENT

(71) Applicant: Yokogawa Electric Corporation, Tokyo (JP)

(72) Inventor: Jasper Bryan Sale Ratilla, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 190 days.

(21) Appl. No.: 16/697,641

(22) Filed: Nov. 27, 2019

(65) Prior Publication Data

US 2021/0157305 A1     May 27, 2021

(51) Int. Cl.
*G05B 19/418*     (2006.01)
*G06F 16/23*      (2019.01)

(52) U.S. Cl.
CPC ... *G05B 19/41865* (2013.01); *G06F 16/2379* (2019.01); *G05B 2219/39167* (2013.01)

(58) Field of Classification Search
None
See application file for complete search history.

(56) References Cited

U.S. PATENT DOCUMENTS

| | | | | |
|---|---|---|---|---|
| 2002/0171558 A1* | 11/2002 | Bartelheim | .......... | G05B 19/042 340/8.1 |
| 2007/0083275 A1* | 4/2007 | Law | .......... | G05B 23/027 700/19 |
| 2014/0282020 A1* | 9/2014 | Piper | .......... | H04L 41/22 715/735 |
| 2015/0234381 A1* | 8/2015 | Ratilla | .......... | G01F 25/00 702/104 |
| 2017/0017211 A1* | 1/2017 | Periasamy | .......... | G05B 13/0205 |
| 2017/0168883 A1* | 6/2017 | Ratilla | .......... | G06F 11/0745 |
| 2017/0293544 A1* | 10/2017 | Katayama | .......... | G05B 19/4184 |

* cited by examiner

*Primary Examiner* — Charles E Anya
(74) *Attorney, Agent, or Firm* — Sheridan Ross P.C.

(57) ABSTRACT

The invention enables registration and configuration of field devices through a plant resource management system. A server receives device identity information corresponding to a plurality of field devices intended to be communicably coupled with the plant resource management system. For each field device, the device identity information includes a device identifier and device-class information. The server generates a configuration data record for each field device. Generating a configuration data record includes (i) identifying a device-class for a field device, (ii) retrieving configuration information for the device-class, (iii) associating the configuration information with the unique device identifier, and (iv) generating a data record comprising the configuration information and the unique device identifier. The field devices are thereafter communicably coupled with the plant resource management system and device configuration parameters within local memory of each field device are modified based on configuration information from the data record corresponding to such field device.

26 Claims, 12 Drawing Sheets

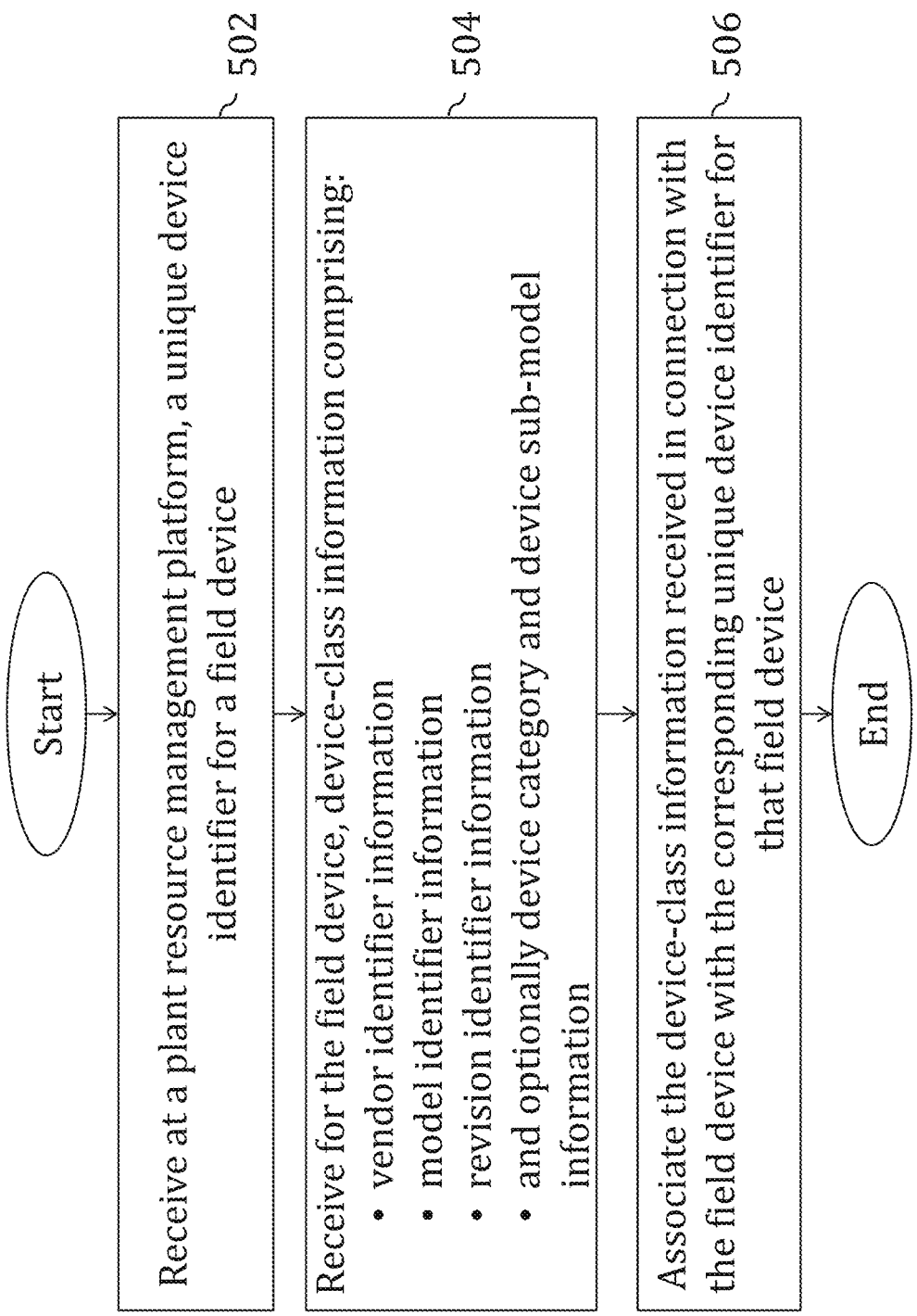

METHODS, SYSTEMS AND COMPUTER PROGRAM PRODUCTS FOR PLANT RESOURCE MANAGEMENT

FIELD OF THE INVENTION

The invention relates to the field of plant resource management, and more specifically to methods, systems and computer program products that enable the registration and configuration of a plurality of field devices through a plant resource management system.

BACKGROUND OF THE INVENTION

Industrial environments implement distributed process control systems for running and controlling processes for manufacturing, conversion, or production. Distributed process control systems typically include one or more process controllers that are connected to one or more field devices. Field devices, may include valves, valve actuators, switches, and transmitters (e.g. temperature, pressure, level, and flow sensors) located within the industrial environment, and which are configured for physical control functions or process control functions. Examples of field device control functions include opening or closing valves, and measuring process and/or environmental parameters (e.g. temperature or pressure) for controlling one or more processes within the process plant or system.

At the other end, a process controller may be configured to receive signals generated by field devices, wherein the received signals convey information corresponding to process parameters measured by the field devices and/or other information concerning states of the field devices. The process controller may additionally execute a control application that implements one or more control modules for implementing process control decisions. Control modules within the process controller send control signals to field devices through communication lines or connections, to control operation of one or more of the field devices. Input-output (I/O) devices that are located as communication intermediaries between a process controller and one or more field devices enable data transfer and control instruction transfers between the process controller and the field devices, by converting electrical signals to digital values and by sending and receiving such signals over one or more communication protocols.

A distributed process control system with a process plant includes one or more process controllers, and each controller is connected to one or more field devices via I/O devices. The one or more controllers store control applications and implement the control strategies for the control and operation. A distributed control system may be communicably coupled to a plant resource management platform that tracks or collects data related to the various plant assets or plant equipment, including, but not limited to, field devices, rotating equipment and key machineries. A plant resource management platform stores and provides device-related data and/or performance data for all devices or assets in a plant or group of plants, for the purposes of monitoring the statuses and health of plant assets and conducting maintenance work. Additionally, the plant resource management platform serves as a communication intermediary between a plant operator or an operator terminal on one hand, and one or more field devices on the other hand—for the purposes of enabling efficient configuration, commissioning, inspection, maintenance of such field devices.

FIG. 1 illustrates a distributed process control system 100 of a type that may be used for process control within an industrial environment. Process control system 100 comprises an operator terminal 102, a plant resource management platform 104, and a field device network 106.

Operator terminal 102 comprises any processor implemented terminal device or client device communicably coupled with plant resource management platform 104. Operator terminal 102 may be configured to enable an operator to transmit instructions to and receive data from, plant resource management platform 104.

Plant resource management platform 104 comprises a plant resource management server 104a, a plant resource management database 104b and a plant resource management gateway interface 104c. Plant resource management server 104a may include at least one processor, and one or more transitory and/or non-transitory memories. Plant resource management server 104a may be configured to implement one or more functions of a process controller discussed above. Plant resource management database 104b may include a non-transitory memory based database, configured to store data records corresponding to field devices, including for example, device parameter data, device description files, and device documents corresponding thereto. Plant resource management gateway interface 104c may include a hardware or software network gateway configured to enable transmission and receipt of communications by plant resource management platform 104.

During setting up or upgrading of a plant, new field devices are registered and configured in a plant resource management system within the plant facility for management of those devices—and a conventional process of registering and configuring the field devices using the plant resource management system within a plant facility is illustrated in the flowchart of FIG. 2.

Step 202 of FIG. 2 comprises implementing front end engineering design (FEED) for plant construction—wherein FEED focuses on identifying and setting out technical requirements of the new or upgraded distributed control system for entering into the execution phases. Step 204 comprises model selection for field devices which require to be procured for the new or upgraded distributed control system to meet the technical requirements arising out of the FEED.

At step 206, field devices identified during the model selection step are manufactured or procured through vendors. At step 208, the field devices are installed within the plant facility. The installation step includes communicably coupling the field devices with a plant resource management platform, configuring the field devices for operations within the distributed control system, and configuring the plant resource management platform and/or software implemented thereon, to control and communicate with the installed field devices.

Pre-commissioning of the installed field devices is carried out at step 210. The step of pre-commissioning field devices comprises one or more of equipment inspection, checking of units and facilities against designs, such as the piping and instrumentation diagram (P&ID), flushing, cleaning, pressure testing, functional testing, simulations and other forms of device testing.

Thereafter, step 212 comprises commissioning of the new or upgraded plant facility—which includes a validation and verification process to confirm that the field devices, equipment, facility or industrial plant will perform one or more specified functions according to the design objectives or specifications.

As would be understood from the above, conventional processes for setting up and configuring plant facilities (and distributed control systems within plant facilities) are linear processes, where each step necessarily requires completion of the earlier steps. As a result, the steps of selecting specific field device configurations, obtaining and installing field devices having the selected configurations, and configuring the plant resource management platform and/or software implemented thereon to control the installed field devices, can only be carried out after completion of device manufacture and installation. Since the steps of selecting field device configurations, obtaining and installing selected field devices, and configuring the plant resource management platform and/or software implemented thereon, are all time and resource intensive, existing linear approaches have been found to be unsatisfactory. This is particularly the case, since linear approaches increase the overall time and effort required for deployment of a new or upgraded plant facility.

There is accordingly a need for solutions that enable completion of some or all of the steps of selection of specific field device configurations, obtaining field devices having the requisite configurations, and configuring the plant resource management platform and/or software implemented thereon to control field devices having such configurations, simultaneously or in parallel with the steps of field device manufacture, procurement and installation—with a view to reduce the overall time and cost involved in deployment of a new or upgraded plant facility.

SUMMARY

The invention provides methods, systems and computer program products that enable the registration and configuration of a plurality of field devices through a plant resource management system—wherein the registration and configuration may occur simultaneously with the steps of field device manufacture, procurement and installation.

In an embodiment, the invention provides a method for configuring a plant resource management system, for monitoring or controlling a plurality of field devices. The method comprises (i) receiving device identity information corresponding to a plurality of field devices that are intended to be communicably coupled with the plant resource management system, wherein the received device identity information includes, for each field device within the plurality of field devices (a) a unique first device identifier corresponding to the field device, and (b) device-class information corresponding to the field device, (ii) for each field device within the plurality of field devices, generating and storing a device configuration data record, wherein generating the device configuration data record comprises (c) identifying a device-class for the field device, wherein the identification is based on the received device-class information corresponding to the field device, (d) retrieving pre-stored device configuration information associated with the identified device-class, (e) associating the retrieved pre-stored device configuration information with the unique first device identifier corresponding to the field device, (f) optionally (where applicable) associating the field device (that is being associated with the pre-stored device configuration information through its unique first device identifier) with an existing plant hierarchy and/or to a network view corresponding to a process control environment or a distributed control system within a process control environment, and (g) generating a data record comprising the retrieved pre-stored device configuration information, the associated unique first device identifier corresponding to the field device, and the associated plant hierarchy and/or network view information, where applicable, (iii) communicably coupling the plurality of field devices with the plant resource management system, and (iv) for each field device within the communicably coupled plurality of field devices (h) identifying a stored device configuration data record corresponding to the field device, and (i) modifying within a local memory of the field device, one or more device configuration parameters corresponding to the field device, wherein the modification is based on pre-stored device configuration information retrieved from the identified stored device configuration data record corresponding to the field device.

In an embodiment of the method, wherein the unique first device identifier corresponding to the field device is a unique device tag.

In a specific method embodiment, the device-class information corresponding to the field device is determined by vendor identifier information, model identifier information, revision identifier information.

In a particular embodiment of the method, identification of the device-class for the field device is based on the received vendor identifier information, model identifier information, revision identifier information, device category and device sub-model. The device category represents a function that a field device performs, for instance, whether it functions as temperature transmitter, pressure transmitter or level transmitter, and performs measurement of temperature, pressure or level.

In implementing the method each generated device configuration data record may be stored in a database communicably coupled with the plant resource management system. Further, the pre-stored device configuration information for each field device includes one or more device configuration parameters corresponding to said field device.

In certain embodiments of the method, identifying a stored device configuration data record corresponding to a field device within the communicably coupled plurality of field devices comprises (i) retrieving from a local memory of the field device, a unique second device identifier corresponding to the field device, and (ii) identifying based on the unique second device identifier, a stored device configuration data record.

In certain method embodiments, the unique second device identifier corresponding to the field device is identical to the unique first device identifier within the identified stored device configuration data record.

In an embodiment of the method, generating and storing a device configuration data record corresponding to at least one field device within the plurality of field devices includes the step of receiving plant hierarchy information corresponding to such field device, said plant hierarchy information describing a position or location of such field device within a hierarchical control structure implemented by the plant resource management platform.

In another embodiment of the method, generating and storing the device configuration data record corresponding to the at least one field device within the plurality of field devices includes the step of associating the received plant hierarchy information with the unique first device identifier corresponding to such field device.

In a specific embodiment of the method, responsive to determining that the received plant hierarchy information corresponding to such field device is inconsistent with a plant hierarchy that has been implemented by the plant resource management platform, the device configuration data record corresponding to such field device is generated without associating the received plant hierarchy information with the unique first device identifier corresponding to such field device.

In an exemplary embodiment of the method, responsive to determining that the unique first device identifier corresponding to the field device within the plurality of field devices is associated with incorrect plant hierarchy information, re-associating the unique first device identifier corresponding to the field device with correct plant hierarchy information.

In a particular embodiment of the method, generating and storing a device configuration data record corresponding to at least one field device within the plurality of field devices includes the step of receiving network view information corresponding to such field device, said network view information describing physical location of the field device within the network or corresponding to a device path associated with such field device.

In one embodiment of the method, the network view information includes information corresponding to any one or more of engineering project, field control station, safety control station, node, input/output module, unit, slot and channel corresponding to the field device.

The invention additionally provides a plant resource management system, configured for monitoring or controlling a plurality of field devices. The plant resource management system comprises a plant resource management server configured to (i) receive device identity information corresponding to a plurality of field devices that are intended to be communicably coupled with the plant resource management server, wherein the received device identity information includes, for each field device within the plurality of field devices (a) a unique first device identifier corresponding to the field device, and (b) device-class information corresponding to the field device, (ii) generate and store for each field device within the plurality of field devices, a device configuration data record, wherein generating the device configuration data record comprises (c) identifying a device-class for the field device, wherein the identification is based on the received device-class information corresponding to the field device, (d) retrieving pre-stored device configuration information associated with the identified device-class, (e) associating the retrieved pre-stored device configuration information with the unique first device identifier corresponding to the field device, (f) optionally (where applicable) associating the field device (that is being associated with the pre-stored device configuration information through its unique first device identifier) with an existing plant hierarchy and/or to a network view corresponding to a process control environment or a distributed control system within a process control environment, and (g) generating a data record comprising the retrieved pre-stored device configuration information, the associated unique first device identifier corresponding to the field device, and the associated plant hierarchy and/or network view information, where applicable, (iii) communicably connect with the plurality of field devices, and (iv) for each field device within the communicably connected plurality of field devices (h) identify a stored device configuration data record corresponding to the field device, and (i) modify within a local memory of the field device, one or more device configuration parameters corresponding to the field device, wherein the modification is based on pre-stored device configuration information retrieved from the identified stored device configuration data record corresponding to the field device.

The system may be configured such that the unique first device identifier corresponding to the field device is a unique device tag.

In a system embodiment, the device-class information corresponding to the field device includes vendor identifier information, model identifier information and revision identifier information.

In another system embodiment, identification of the device-class for the field device is based on the received vendor identifier information, model identifier information, and revision identifier information.

The system may be configured such that each generated device configuration data record is stored in a database communicably coupled with the plant resource management system.

In some particular system embodiments, the pre-stored device configuration information for each field device includes one or more device configuration parameters corresponding to said field device.

In other system embodiments, identifying a stored device configuration data record corresponding to a field device within the communicably coupled plurality of field devices comprises (i) retrieving from a local memory of the field device, a unique second device identifier corresponding to the field device, and (ii) identifying based on the unique second device identifier, a stored device configuration data record.

The system may be configured such that the unique second device identifier corresponding to the field device is identical to the unique first device identifier within the identified stored device configuration data record.

In an embodiment, the system may be configured such that generating and storing a device configuration data record corresponding to at least one field device within the plurality of field devices includes the step of receiving plant hierarchy information corresponding to such field device, said plant hierarchy information describing a position or location of such field device within a hierarchical control structure implemented by the plant resource management platform.

In another embodiment, the system may be configured such that generating and storing the device configuration data record corresponding to the at least one field device within the plurality of field devices includes the step of associating the received plant hierarchy information with the unique first device identifier corresponding to such field device.

In a particular embodiment of the invention, the system may be configured such that responsive to determining that the received plant hierarchy information corresponding to such field device is inconsistent with a plant hierarchy that has been implemented by the plant resource management platform, the device configuration data record corresponding to such field device is generated without associating the received plant hierarchy information with the unique first device identifier corresponding to such field device.

In one embodiment, the system may be configured such that responsive to determining that the unique first device identifier corresponding to the field device within the plurality of field devices is associated with incorrect plant hierarchy information, re-associating the unique first device identifier corresponding to the field device with correct plant hierarchy information.

In a specific embodiment, the system may be configured such that generating and storing a device configuration data record corresponding to at least one field device within the plurality of field devices includes the step of receiving network view information corresponding to such field device, said network view information describing physical location of the field device within the network or corresponding to a device path associated with such field device.

The system may in an embodiment be configured such that the network view information includes information corresponding to any one or more of engineering project, field control station, safety control station, node, input/output module, unit, slot and channel corresponding to the field device.

The invention further provides a computer program product for configuring a plant resource management system, for monitoring or controlling a plurality of field devices. The computer program product comprises a non-transitory computer usable medium having a computer readable program code embodied therein, the computer readable program code comprising instructions for implementing within a processor based computing system, the steps of (i) receiving device identity information corresponding to a plurality of field devices that are intended to be communicably coupled with the plant resource management system, wherein the received device identity information includes, for each field device within the plurality of field devices (a) a unique first device identifier corresponding to the field device, and (b) device-class information corresponding to the field device, (ii) for each field device within the plurality of field devices, generating and storing a device configuration data record, wherein generating the device configuration data record comprises (c) identifying a device-class for the field device, wherein the identification is based on the received device-class information corresponding to the field device, (d) retrieving pre-stored device configuration information associated with the identified device-class, (e) associating the retrieved pre-stored device configuration information with the unique first device identifier corresponding to the field device, (f) optionally (where applicable) associating the field device (that is being associated with the pre-stored device configuration information through its unique first device identifier) with an existing plant hierarchy and/or to a network view corresponding to a process control environment or a distributed control system within a process control environment, and (g) generating a data record comprising the retrieved pre-stored device configuration information, the associated unique first device identifier corresponding to the field device, and the associated plant hierarchy and/or network view information, where applicable, (iii) communicably coupling the plurality of field devices with the plant resource management system, and (iv) for each field device within the communicably coupled plurality of field devices (h) identifying a stored device configuration data record corresponding to the field device, and (i) modifying within a local memory of the field device, one or more device configuration parameters corresponding to the field device, wherein the modification is based on pre-stored device configuration information retrieved from the identified stored device configuration data record corresponding to the field device.

BRIEF DESCRIPTION OF THE ACCOMPANYING DRAWINGS

FIG. 5 is a flowchart illustrating a method of associating a device identifier corresponding to a field device with device-class information of such field device, in accordance with the present invention.

DETAILED DESCRIPTION

The invention provides methods, systems and computer program products that enable the registration and configuration of a plurality of field devices through a plant resource management system—wherein the registration and configuration may occur simultaneously with the steps of field device manufacture, procurement and installation. In various embodiments, the invention enables (i) registration of, or generation of configuration data records for, field devices prior to such field devices being communicably coupled with or integrated into a distributed control system, and (ii) further enables automated configuration of such field devices based on generated configuration data records corresponding to such field devices, as and when the field devices are communicably coupled with or integrated into the distributed control system of a plant facility.

For the purposes of the below written description, the terms "field device", and "sensor(s)" may be used interchangeably and shall be understood as referring to a device or component that is configured to monitor or control parameters corresponding to one or more assets, devices, components, tags, hardware, software or data parameters, within an industrial environment.

Figure 3:
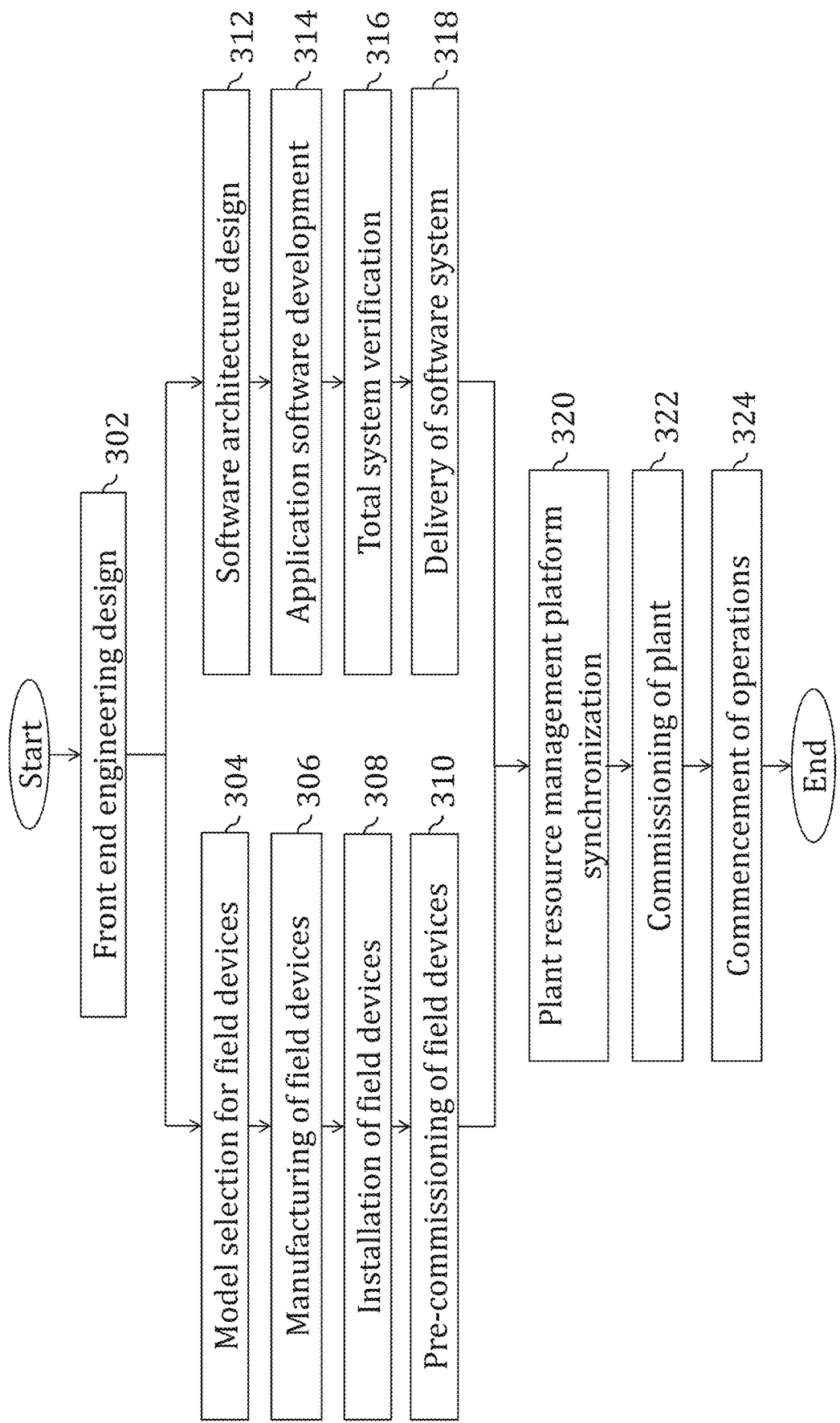
FIG. 3 is a flowchart illustrating a process for setting up or upgrading a plant facility that is enabled by the teachings of the present invention.

FIG. 3 is a flowchart illustrating a process for setting up or upgrading a distributed control system with a plant facility, according to the teachings of the present invention. The objective of the method of FIG. 3 is to enable setting up or upgrading of a distributed control system within a plant facility in a manner that enables multiple stages to be carried out in parallel—thereby reducing the overall time and cost investment associated with the process.

The invention achieves this through methods where the steps of selecting specific field device configurations, and configuring the plant resource management platform to control field devices having the selected configurations, occurs simultaneously or in parallel with the steps of field device manufacture, procurement and installation, to reduce the overall time and cost involved in deployment of a new or upgraded plant facility.

The method of FIG. 3 commences at step 302, with the process of front end engineering design (FEED). As discussed earlier, the FEED process focuses on identifying and setting out technical requirements of the new plant facility or of the upgraded plant facility for entering into the execution phases.

Thereafter, the process diverges into two parallel process paths—the first process path comprising steps 304 to 310, and the second process path comprising steps 312 to 318. The steps within the first process path and the second process path are implemented in parallel.

As illustrated in FIG. 3, a first step 304 within the first process path comprises model selection for field devices which require to be procured for integration within a process control system for the new or upgraded plant facility to meet the technical requirements arising out of the FEED step.

Thereafter, at step 306, field devices identified during the model selection step are manufactured or procured through vendors.

At step 308, the field devices are installed within the plant facility. Step 310 comprises pre-commissioning of the installed field devices—wherein pre-commissioning may comprise one or more of equipment inspection, checking of units and facilities against designs, such as the piping and instrumentation diagram (P&ID), flushing, cleaning, pressure testing, functional testing, simulations etc.

Simultaneously, a first step 312 within the second process path comprises the step of software architecture design for the distributed control system—wherein the software architecture design stage comprises the process of defining a collection of hardware and software components and their interfaces to establish the framework for the development of a software system for controlling various plant assets or plant equipment. The plant assets or plant equipment may include any of field devices, controllers, I/O devices, servers, communication networks, user interfaces, databases, handheld devices, etc.

Step 314 comprises the process of application software development, wherein the application software system is coded/developed based on the software architecture design that is the outcome of earlier step 312. The application software developed at step 314 may comprise a part or a whole of the plant resource management software that is installed within a plant resource management platform in the plant facility, and that is configured for controlling field devices integrated into the distributed control system of the plant facility.

Step 316 comprises a total system verification of the application software developed at step 314—comprising software testing activities designed to ensure that the developed application software meets all objectives of the FEED process and of the architectural design process. Using the total system verification under agile project execution, field devices could be fully engineered and configured at a very early stage of plant engineering, i.e. even before the physical devices could be commissioned to the plant resource management platform. Responsive to satisfactory system verification, step 318 comprises delivery and installation of the developed software system within the plant resource management platform of the plant facility that is being upgraded or set up.

The first and second process paths of FIG. 3 subsequently converge—and step 320 comprises plant resource management platform synchronization. Plant resource management platform synchronization comprises communicably coupling the installed field devices with the plant resource management platform, and synchronizing the delivered software system and various system parameters and device parameters stored within the delivered software system with the communicably coupled field devices. The synchronization step may include configuring the field devices for operations within the distributed control system, and configuring the plant resource management platform and/or software implemented thereon, to control the installed field devices.

Step 322 comprises commissioning of the new or upgraded plant facility—which includes a validation and verification process used to confirm that the field devices, equipment, the facility, or industrial plant will perform one or more specified functions according to the design objectives or specifications. Step 324 involves commencement of operations upon satisfactory completion of all of prior steps 302 to 322.

The above described parallelized process for setting up or upgrading a plant facility has significant advantages in terms of cost and time efficiencies. In particular, since the parallelized approach chronologically decouples the hardware and software development and installation processes, each can be carried out independent of each other—and upon completion of both stages, the two process paths can converge as shown in FIG. 3. However, to ensure that the software and hardware development and installation processes can be pursed in parallel and can converge together in an efficient manner, it is necessary that the software system(s) developed and installed between steps 312 and 318 of FIG. 3 be configured in a manner that enables efficient and seamless coupling and configuration of the one or more field devices that are being simultaneously manufactured and installed at steps 304 to 310.

The present invention enables the efficient and seamless coupling and configuration of field devices with the developed software. The invention achieves this through a combination of steps for configuring a plant resource management platform—wherein (i) a first sub-set of such steps are implemented at the plant resource management platform prior to installation of field devices, which implementation occurs during a stage of configuring the plant resource management platform, and (ii) a second sub-set of such steps are implemented subsequent to the field devices being communicably coupled with the plant resource management platform, which implementation occurs during a stage of synchronizing the plant resource management platform with the communicably coupled field devices.

The invention achieves this by (i) generating (as part of the first sub-set of steps) software objects corresponding to one or more field devices that are intended to be communicably coupled with the plant resource management platform, and configuring such software objects to store device configuration parameters that are intended to be applied to the field devices, and (ii) thereafter, responsive to a field device being coupled with the plant resource management platform, updating a configuration of such communicably coupled field devices based on device configuration parameters retrieved from a previously generated software object(s) corresponding to such field device.

Figure 4:
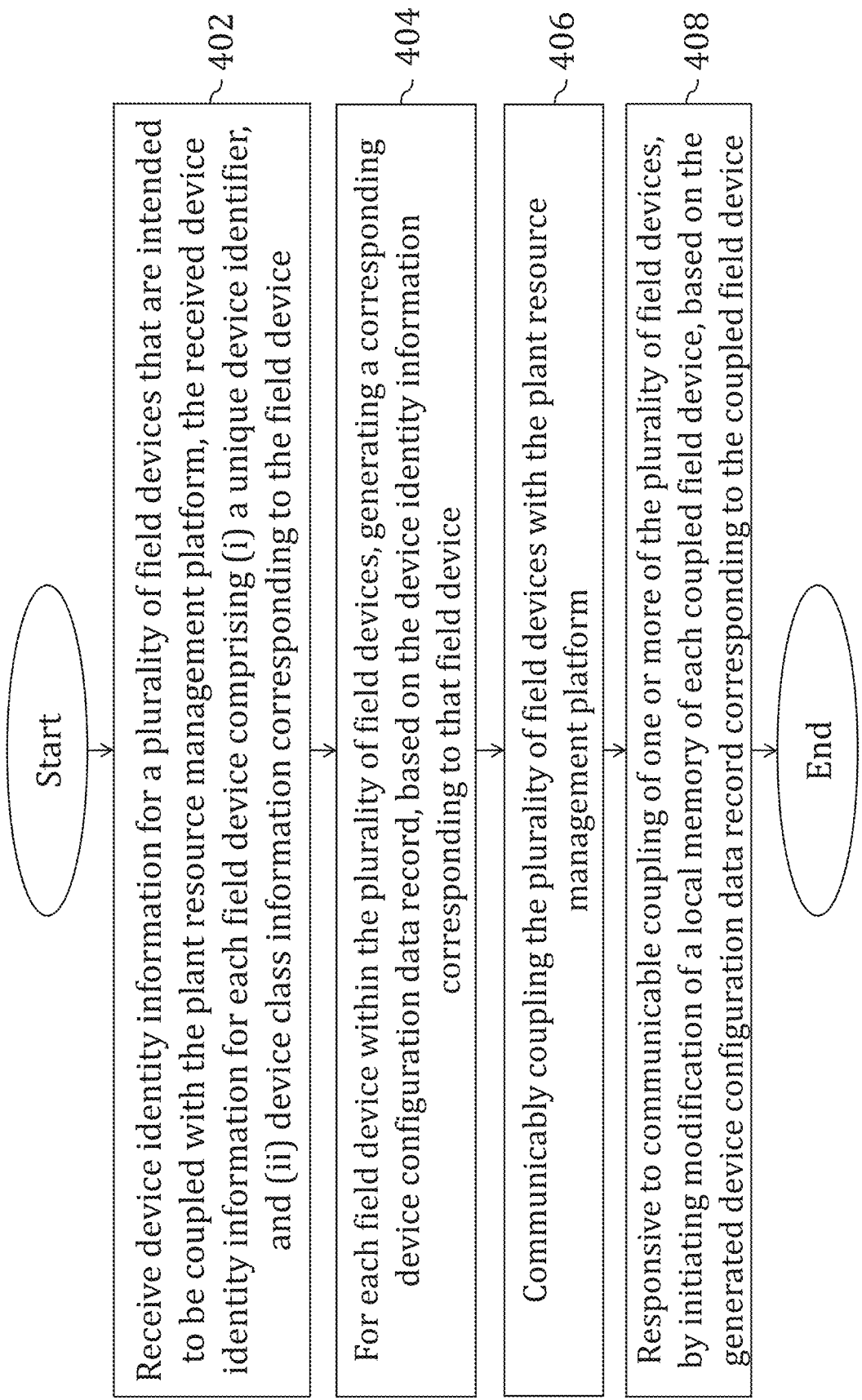
FIG. 4 is a flowchart illustrating a method of configuring field devices for coupling with a plant resource management platform in accordance with the present invention.

FIG. 4 is a flowchart illustrating a method of configuring field devices for coupling with a plant resource management platform, in accordance with the present invention. It would be understood that the method of FIG. 4 may be implemented through a plant resource management platform that is positioned as a communication intermediate between an operator terminal and field devices within a plant facility. In an embodiment, the method of FIG. 4 may be implemented through one or more plant resource management servers within a plant resource management platform.

Step 402 comprises receiving device identity information for each of a plurality of field devices that are intended to be coupled with the plant resource management platform, and in an embodiment, which are not yet coupled with the plant resource management platform. The device identity information corresponding to each field device comprises information that uniquely identifies the field device. In an embodiment, the received device identity information corresponding to a field device comprises (i) a unique device identifier and (ii) device-class information corresponding to the field device.

The unique device identifier may comprise any unique hardware or software device identifier that is uniquely associated with the field device intended to be communicably coupled with the plant resource management platform. In a specific embodiment, each device identifier(s) received at step 402 for a corresponding field device may comprise a unique device tag for that field device.

The device-class information received at step 402, comprises information that describes device identity-related information of the corresponding field device. In various embodiments, the device-class information may include (i) information identifying a vendor of the field device—for example, manufacturer identification information for the field device, (ii) information identifying a model to which the field device corresponds and (iii) information identifying a revision to which the field device corresponds. Intelligent field devices such as HART and FF-H1 protocol-supported devices are uniquely identified by manufacturer identification information (i.e. manufacturer ID), information identifying a model (i.e. device type ID) and information identifying a revision (i.e. device revision), which are collectively referred to as a device-class. In some cases, device-class may also be determined based on some additional information, for instance, information of device category and device sub-model. The device category represents a function that a field device performs, for instance, a pressure transmitter measuring pressure data within an industrial process.

In an embodiment, the device identity information corresponding to a field device is obtained from a device list file or from other inputs (for example, through one or more operator inputs, which may be received, retrieved or imported from, for instance, a distributed control system (DCS), a safety-instrumented system, an engineering system or any other industrial systems. The device list file could be in an excel file form or any other suitable formats, which comprises the information in respect of device tag, device manufacture ID, device type ID, device revision, device communication type, and optionally device address, device tag comment, plant hierarchy, etc. Table 1 below reproduces by way of an example, contents of an illustrative device list file of a type maintained within a distributed control system, and from which device identity information corresponding to a field device, can be imported and obtained.

TABLE 1

| Column Name | Validation | Description |
|---|---|---|
| Device Tag | Required (Value cannot be empty) Primary Key (Should be unique) Data Type: String Max. number of Characters: 32 | |
| Device Manufacturer ID | Required (Value cannot be empty) Data Type: Decimal or Hexadecimal Valid value: 0-65535 | Manufacturer ID can be in hex format or in integer format. If the ID is given as 0x . . . it will be considered as hex value. If the ID is given as integer like 51 it will be considered as int value |
| Device Type ID | Required (Value cannot be empty) Data Type: Decimal or Hexadecimal Valid value: 0-65535 | Device type ID can be in hex format or in integer format. If the ID is given as 0x . . . it will be considered as hex value. If the ID is given as integer like 51 it will be considered as int value |
| Device Revision | Required (Value cannot be empty), Data Type: Decimal or Hexadecimal Valid value: 0-255 | Device revision can be in hex format or in integer format. If the value is given as 0x . . . it will be considered as hex value. If the value is given as integer like 51 it will be considered as int value |
| Device Com Type | Required (Value cannot be empty) Data Type: String Max. number of Characters: 256 | |
| Device Address | Optional (Value can be empty) Data Type: Decimal or Hexadecimal Valid value: 0-65535 | |
| Device Tag Comment | Optional (Value can be empty) Data Type: String Max. number of Characters: 1024 | |
| Plant Hierarchy | Optional (Value can be empty) Data Type: String Max. number of Characters: 32 | This is optional for associating device to Plant Hierarchy. This is the only immediate parent of the Device. |
| VP Project/RS Project FCS/SCS | Optional (Value can be empty) Data Type: String Max. number of Characters: 32 Optional (Value can be empty) Data Type: String Max. number of Characters: 8 | These are optional for associating device to Network View For setting device to Network View, all of these fields should be provided or all should be empty. The format of the data in the fields |

TABLE 1-continued

| Column Name | Validation | Description |
|---|---|---|
| Node | Optional (Value can be empty)<br>Data Type: Integer<br>Valid value: 0-9 | should be same as that of the data obtained when we get the details for AD Suite IO list import tool. Additionally the field unit will be checked only when the IOM type is NIO. We will not be validating the range of the values or the actual values in the Terminal, slot, node, FCS/SCS, project name etc. |
| IOM Type | Optional (Value can be empty)<br>Data Type: String | |
| Unit | Optional (Value can be empty)<br>Data Type: Integer<br>Valid value: 0-6 | |
| Slot | Optional (Value can be empty)<br>Data Type: Integer<br>Valid value: 0-8 | |
| Terminal | Optional (Value can be empty)<br>Data Type: Integer<br>Valid value: 0-64 | |

In another embodiment, the device identity information corresponding to a field device is obtained or retrieved from a device list file, which is imported from, a $3^{rd}$ party system which supports OPC specifications (OPC Foundation). In such circumstances, the device list file from the $3^{rd}$ party system could be imported into the plant resource management platform and the device identity information could be obtained therefrom. The device list could be in an excel file form or any other suitable formats, which comprises the information pertaining to device tag, device vendor, device model, device revision as well as OPC item ID, and optionally device tag comment, and plant hierarchy information, etc. Table 2 below shows by way of an example, an exemplary information within an illustrative device list of a type that can be imported from a 3rd party system which supports OPC specifications, and from which device identity information corresponding to a field device, can be imported.

In some embodiments, the device identity information for each of a plurality of field devices may comprise (i) a unique device identifier, (ii) device-class information corresponding to the field device and (iii) plant hierarchy information for the one or more of field devices among the plurality of field devices. Plant hierarchy information refers to information describing a position or location of a field device within a plant hierarchy. The term "plant hierarchy" may be understood as a hierarchical control structure implemented by the plant resource management platform within a plant—which hierarchical control structure of the plant is defined in the form of a plant hierarchy tree view within a plant resource management platform. The plant hierarchy comprises different hierarchical layers or levels, which may in certain exemplary embodiments include Site, Area, Cell, Unit and Equipment Module—when the plant hierarchy is based on ISA-88 standard. By way of an example, if in a device list file, a field device X belongs to Site A, Area 1, Cell 2, then its plant hierarchy would be Site A→Area 1→Cell 2. Table 3 below reproduces by way of an example, an illustrative plant hierarchy from which plant hierarchy information for the purposes of generating or compiling device identity information for each of the plurality of field devices, can be imported.

TABLE 2

| Column Name | Validation | Description |
|---|---|---|
| Device Tag | Required (Value cannot be empty)<br>Primary Key (Should be unique)<br>Data Type: String<br>Max. number of Characters: 32 | |
| Device Tag Comment | Optional (Value can be empty)<br>Data Type: String<br>Max. number of Characters: 1024 | |
| Vendor | Required (Value cannot be empty)<br>Data Type: String<br>Max. number of Characters: 32 | |
| Model | Required (Value cannot be empty)<br>Data Type: String<br>Max. number of Characters: 32 | |
| Revision | Required (Value cannot be empty)<br>Data Type: Decimal or Hexadecimal<br>Valid value: 0-225 | |
| OPC Item ID | Required (Value cannot be empty)<br>Data Type: String<br>Max. number of Characters: 256 | OPC Item ID can be different across devices in a system but the datatype should be the same for all devices as well as the status mapping. Datatype should be String with maximum length of 256 512 characters. |
| PRM Plant Site | Optional (Value can be empty)<br>Data Type : String<br>Max. number of Characters: 32 | |
| PRM Plant Area | Optional (Value can be empty)<br>Data Type: String<br>Max. number of Characters: 32 | |

TABLE 2-continued

| Column Name | Validation | Description |
|---|---|---|
| PRM Plant Cell | Optional (Value can be empty)<br>Data Type: String<br>Max. number of Characters: 32 | |
| PRM Plant Unit | Optional (Value can be empty)<br>Data Type: String<br>Max. number of Characters: 32 | |
| PRM Plant Module | Optional (Value can be empty)<br>Data Type: String<br>Max. number of Characters: 32 | |

TABLE 3

| Column Name | Validation | Description |
|---|---|---|
| PRM Plant Site | Optional (Value can be empty)<br>Data Type : String<br>Max. number of Characters: 32 | |
| PRM Plant Area | Optional (Value can be empty)<br>Data Type: String<br>Max. number of Characters: 32 | |
| PRM Plant Process Cell | Optional (Value can be empty)<br>Data Type: String<br>Max. number of Characters: 32 | |
| PRM Plant Unit | Optional (Value can be empty)<br>Data Type: String<br>Max. number of Characters: 32 | |
| PRM Plant Module | Optional (Value can be empty)<br>Data Type: String<br>Max. number of Characters: 32 | |

Figure 2:
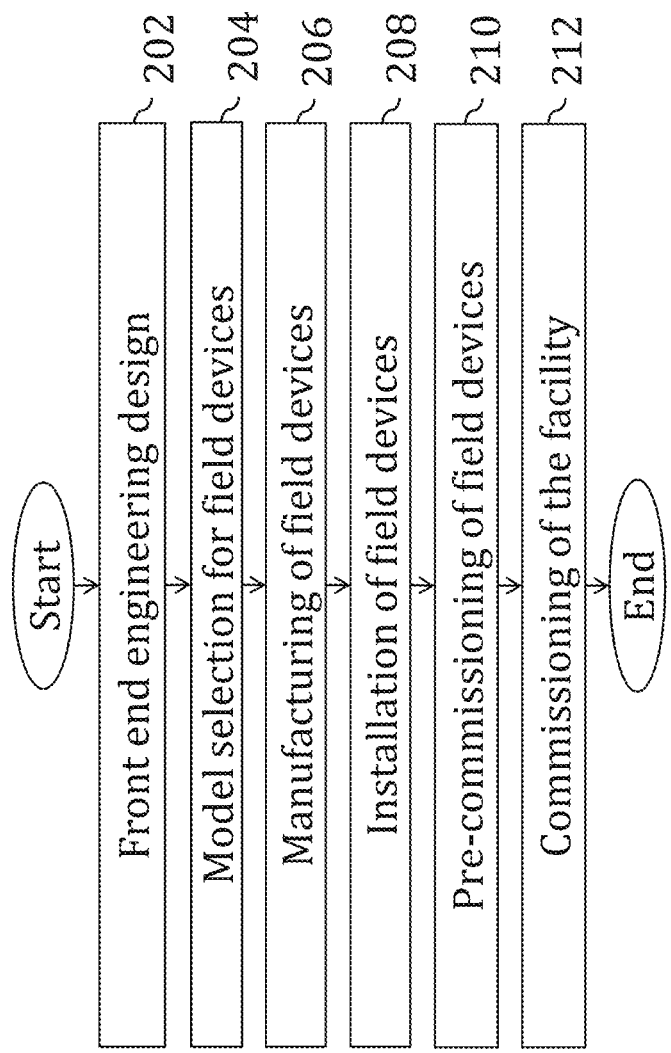
FIG. 2 is a flowchart illustrating a conventional process for upgrading or setting up a plant facility.

In an embodiment of the method of FIG. 2, the device-class information of step 402 is received or identified based on inputs received from an operator terminal communicably coupled with the plant resource server management platform. The inputs may comprise the device-class information itself, or may comprise inputs that enable retrieval or selection of one or more items of device-class information that is stored in a database of device-class information and that is located within or communicably coupled with the plant resource server management platform.

Step 404 comprises generating, for each field device within the plurality of field devices, a corresponding device configuration data record. The device configuration data record may be generated based on the device identity information corresponding to such field device (i.e. the device identity information received at step 402). In an embodiment, each device configuration data record generated at step 404 comprises a data record that includes at least (i) the unique device identifier and (ii) device-class information corresponding to the field device, which preferably includes manufacturer identification information or vendor identifier information for the field device, information identifying a model to which the field device corresponds, information identifying a revision to which the field device corresponds, and (iii) the retrieved pre-stored device configuration information. The one or more data records generated at step 404 may be stored within a non-transitory memory based database located within or coupled with the plant resource management platform.

Step 406 comprises communicably coupling the plurality of field devices with the plant resource management platform. It would be understood that communicable coupling of the plurality of field devices with the plant resource management platform occurs when the field devices are installed and connected with the plant resource management platform through one or more communication buses or through any other form of direct communication or network communication.

Step 408 comprises responding to communicable coupling of one or more of the plurality of field devices with the plant resource management platform, by initiating modification of a local memory within each coupled field device—wherein the local memory of a coupled field device is modified based on information within a device configuration data record corresponding to such field device (that has been generated in accordance with method step 404).

In an embodiment of method of FIG. 4, modifying a local memory of a coupled field device comprises updating a memory state within the local memory of such field device. In a more specific embodiment, updating a memory state within the local memory of the field device comprises recording within the local memory, one or more device configuration parameters retrieved from the device configuration data record corresponding to such field device.

By modifying the local memory of a coupled field device based on device configuration parameters retrieved from a previously generated device configuration data record, the method of FIG. 4 ensures that one or more software objects comprising configuration information (in the form of configuration parameters) for a field device can be generated and stored at a plant resource management server prior to communicably coupling the field device with the plant resource management server. This additionally ensures that once the field device is communicably coupled and online, the field device can be automatically configured by the plant resource management platform without manual intervention, based on the previously generated software object(s) corresponding to such field device.

FIG. 5 is a flowchart illustrating a method of associating a device identifier corresponding to a field device with device-class information for such field device, in accordance with the present invention. In an embodiment, the method of FIG. 5 is implemented as part of method step 404 from FIG. 4. The method of FIG. 5 may be implemented through a plant resource management platform that is positioned as a communication intermediate between an operator terminal and field devices within a plant facility. In an embodiment, the method of FIG. 5 may be implemented through one or more plant resource management servers within a plant resource management platform.

Step 502 of FIG. 5 comprises receiving at the plant resource management platform, a unique device identifier for a field device. The field device may comprise a field device that is intended to be communicably coupled with the plant resource management platform—and corresponding to which, the plant resource management platform has initiated a process for generating a software object or a device configuration data record comprising device configuration information that is intended to control operation of the field device. In an embodiment, the unique device identifier may comprise the device identifier received at step 402 of FIG. 4—and may comprise any unique hardware or software device identifier that is uniquely associated with the field device intended to be communicably coupled with the plant resource management platform. In a specific embodiment, the device identifier(s) received at step 502 for a field device may comprise a unique device tag for that field device.

Step 504 comprises receiving at the plant resource management platform, device-class information corresponding to the field device. In an embodiment, device-class information corresponding to a field device, that is received at step 504, comprises at least (i) information identifying a vendor of the field device—for example, manufacturer identification information for the field device, (ii) information identifying a model to which the field device corresponds, and (iii) information identifying a revision to which the field device corresponds. The received device-class information may optionally include device category and device sub-model information. The device category indicates a function that a field device performs.

Step 506 comprises associating at the plant resource management platform, the device-class information received in connection with the field device, with the corresponding unique device identifier for that field device. In an embodiment, generating the association of step 506 may comprise generating a data record wherein both of the device-class information and the unique device identifier are correlated through a primary key or a secondary key. In an embodiment, the unique device identifier itself may be designated as the primary key or as a secondary key for achieving the correlation.

Figure 6A:
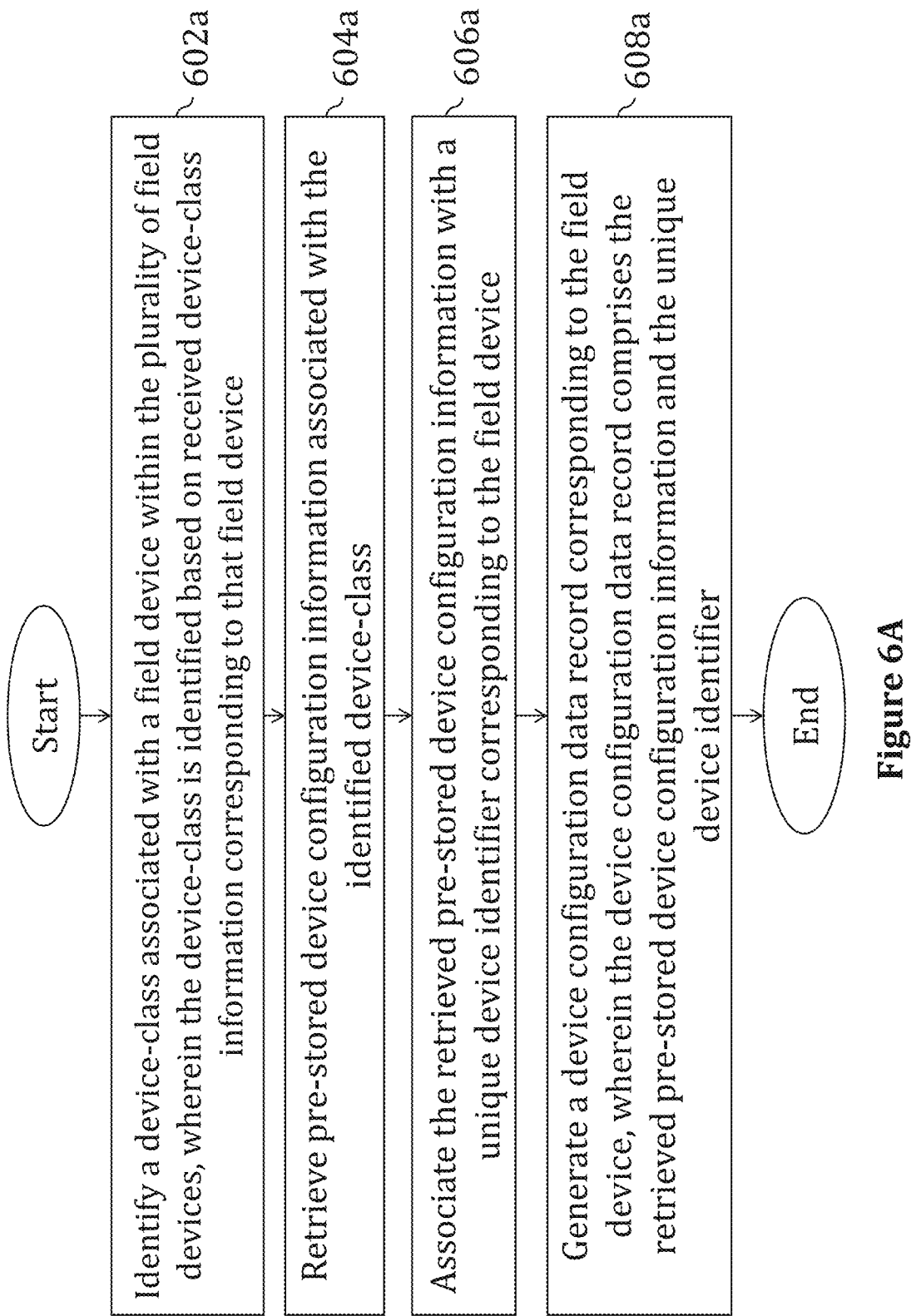
FIG. 6A is a flowchart illustrating a first embodiment of a method of generating a device configuration data record, in accordance with the present invention.

FIG. 6A is a flowchart illustrating a first embodiment of a method of generating a device configuration data record corresponding to a field device, in accordance with the present invention. In an embodiment, the method of FIG. 6A is implemented as part of method step 404 from FIG. 4. The method of FIG. 6A may be implemented through a plant resource management platform that is positioned as a communication intermediate between an operator terminal and field devices within a plant facility. In an embodiment, the method of FIG. 6A may be implemented through one or more plant resource management servers within a plant resource management platform.

Step 602a of FIG. 6A comprises identifying a device-class associated with a field device. Identification of the device-class is based on received device-class information corresponding to the field device. In an embodiment, the received device-class information may comprise device-class information received at step 402 of FIG. 4 and/or step 504 of FIG. 5. In a specific embodiment, the received device-class information may include (i) information identifying a vendor of the field device—for example, manufacturer identification information for the field device, (ii) information identifying a model to which the field device corresponds, and (iii) information identifying a revision to which the field device corresponds.

In an embodiment, the device-class information may be received from an operator terminal communicatively coupled with the plant resource management platform.

Step 604a comprises retrieving pre-stored device configuration information associated with the identified device-class associated with the field device. The pre-stored device configuration information may be retrieved from a database within or communicatively coupled with the plant resource management platform—which database may be configured to retrievably store device configuration information corresponding to each of a plurality of device-classes. In an embodiment, retrieving pre-stored device configuration information associated with the identified device-class associated with the field device, comprises parsing data records within the database, identifying one or more pre-stored device configuration data records corresponding to the identified device-class, and extracting device configuration information from the identified one or more pre-stored device configuration data records. The pre-stored device configuration information comprises a parameter set, which includes one or more of parameters and their respective values.

In an embodiment, the retrieved pre-stored device configuration information may comprise one or more device configuration parameters corresponding to the identified device-class. In a more particular embodiment, the one or more device configuration parameters corresponding to the identified device-class may comprise any parameters that control the operation(s), functions(s), sensitivity, alarm limits, or selectable states of the identified device-class. The field devices being downloaded with the different pre-stored device configurations may be configured differently to function as, for instance, valve actuators, valve positioners, switches or transmitters for measuring temperature, pressure or flow rate, and controlling the related operations.

Step 606a comprises associating the retrieved pre-stored device configuration information with a unique device identifier corresponding to the field device that has been identified at step 602a. In an embodiment, the unique device identifier may comprise the device identifier received at step 402 of FIG. 4—and may comprise any unique hardware or software device identifier that is uniquely associated with the field device intended to be communicably coupled with the plant resource management platform. In a specific embodiment, the device identifier(s) for a field device may comprise a unique device tag for that field device.

Step 608a comprises generating a device configuration data record corresponding to the identified field device—wherein the generated device configuration data record comprises the retrieved pre-stored device configuration information and the associated unique device identifier. In an embodiment, the device configuration data record generated at step 608a comprises a data record that includes at least (i) the unique device identifier and (ii) the retrieved pre-stored device configuration information. The device configuration data record generated at step 608a may be stored within a non-transitory memory based database located within or coupled with the plant resource management platform.

Figure 6B:
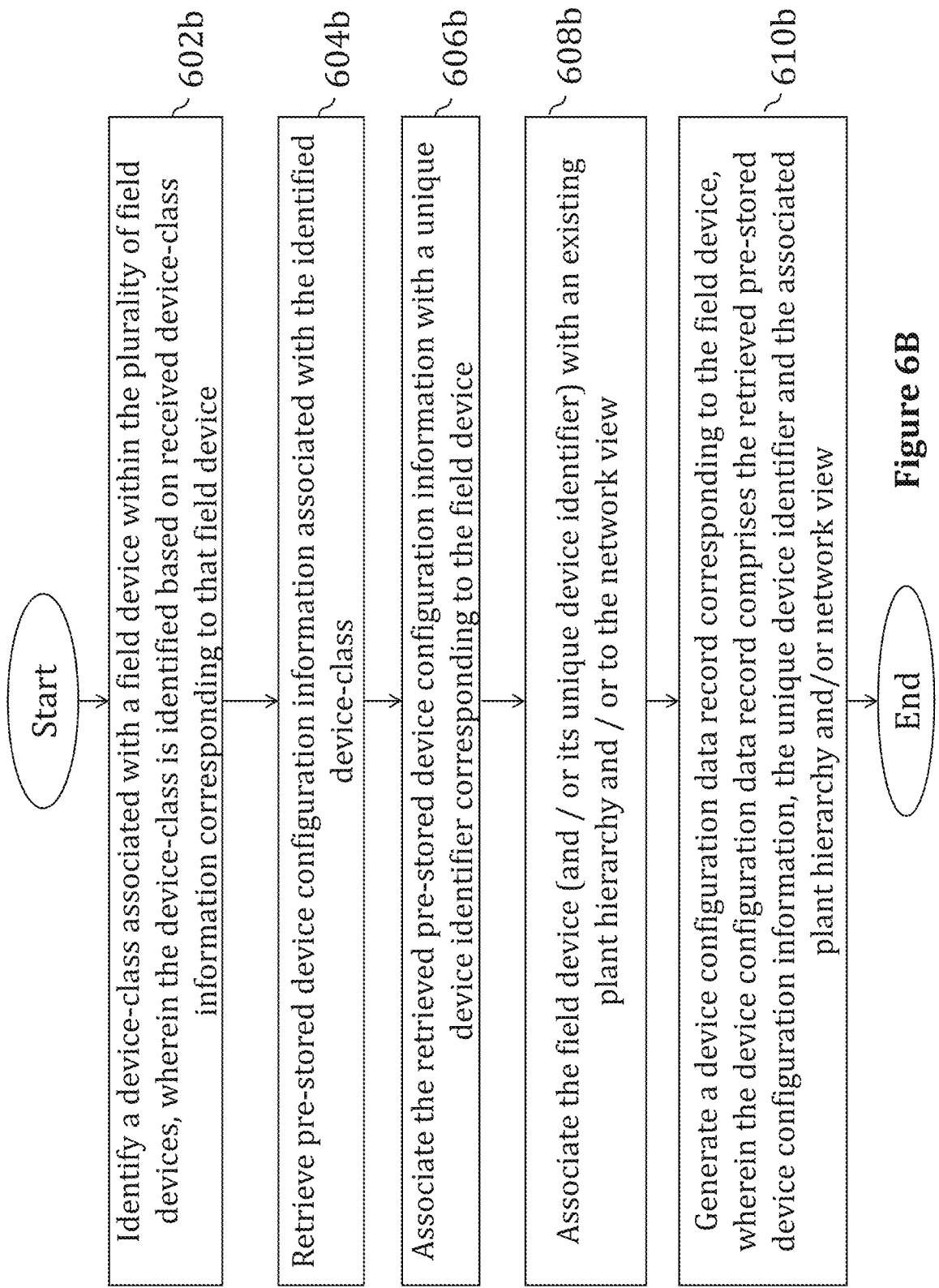
FIG. 6B is a flowchart illustrating a second embodiment of a method of generating a device configuration data record, in accordance with the present invention.

FIG. 6B illustrates a second embodiment of a method of generating a device configuration data record corresponding to a field device, in accordance with the present invention. The method of FIG. 6B may be implemented as part of method step 404 from FIG. 4. The method of FIG. 6B may be implemented through a plant resource management platform that is positioned as a communication intermediate between an operator terminal and field devices within a plant facility. In an embodiment, the method of FIG. 6B may be implemented through one or more plant resource management servers within a plant resource management platform.

Step 602b comprises identifying a device-class associated with a field device, based on received device-class information corresponding to the field device. In an embodiment, the received device-class information may comprise device-class information received at step 402 of FIG. 4 and/or step 504 of FIG. 5. In a specific embodiment, the received device-class information may include (i) information identifying a vendor of the field device—for example, manufacturer identification information for the field device, (ii) information identifying a model to which the field device corresponds, and (iii) information identifying a revision to which the field device corresponds.

Step 604b comprises retrieving pre-stored device configuration information associated with the identified device-class associated with the field device. The pre-stored device configuration information may be retrieved from a database within or communicatively coupled with the plant resource management platform—which database may be configured to retrievably store device configuration information corresponding to each of a plurality of device-classes. In an embodiment, retrieving pre-stored device configuration information associated with the identified device-class associated with the field device, comprises parsing data records within the database, identifying one or more pre-stored device configuration data records corresponding to the identified device-class, and extracting device configuration information from the identified one or more pre-stored device configuration data records. The pre-stored device configuration information comprises a parameter set, which includes one or more of parameters and their respective values.

In an embodiment, the retrieved pre-stored device configuration information may comprise one or more device configuration parameters corresponding to the identified device-class. In a more particular embodiment, the one or more device configuration parameters corresponding to the identified device-class may comprise any parameters that control the operation(s), functions(s), sensitivity, alarm limits, or selectable states of the identified device-class. The field devices being downloaded with the different pre-stored device configurations may be configured differently to function as, for instance, valve actuators, valve positioners, switches or transmitters for measuring temperature, pressure or flow rate, and controlling the related operations.

Step 606b comprises associating the retrieved pre-stored device configuration information with a unique device identifier corresponding to the field device that has been identified at step 602b. In an embodiment, the unique device identifier may comprise the device identifier received at step 402 of FIG. 4—and may comprise any unique hardware or software device identifier that is uniquely associated with the field device intended to be communicably coupled with the plant resource management platform. In a specific embodiment, the device identifier(s) for a field device may comprise a unique device tag for that field device.

Figure 7:
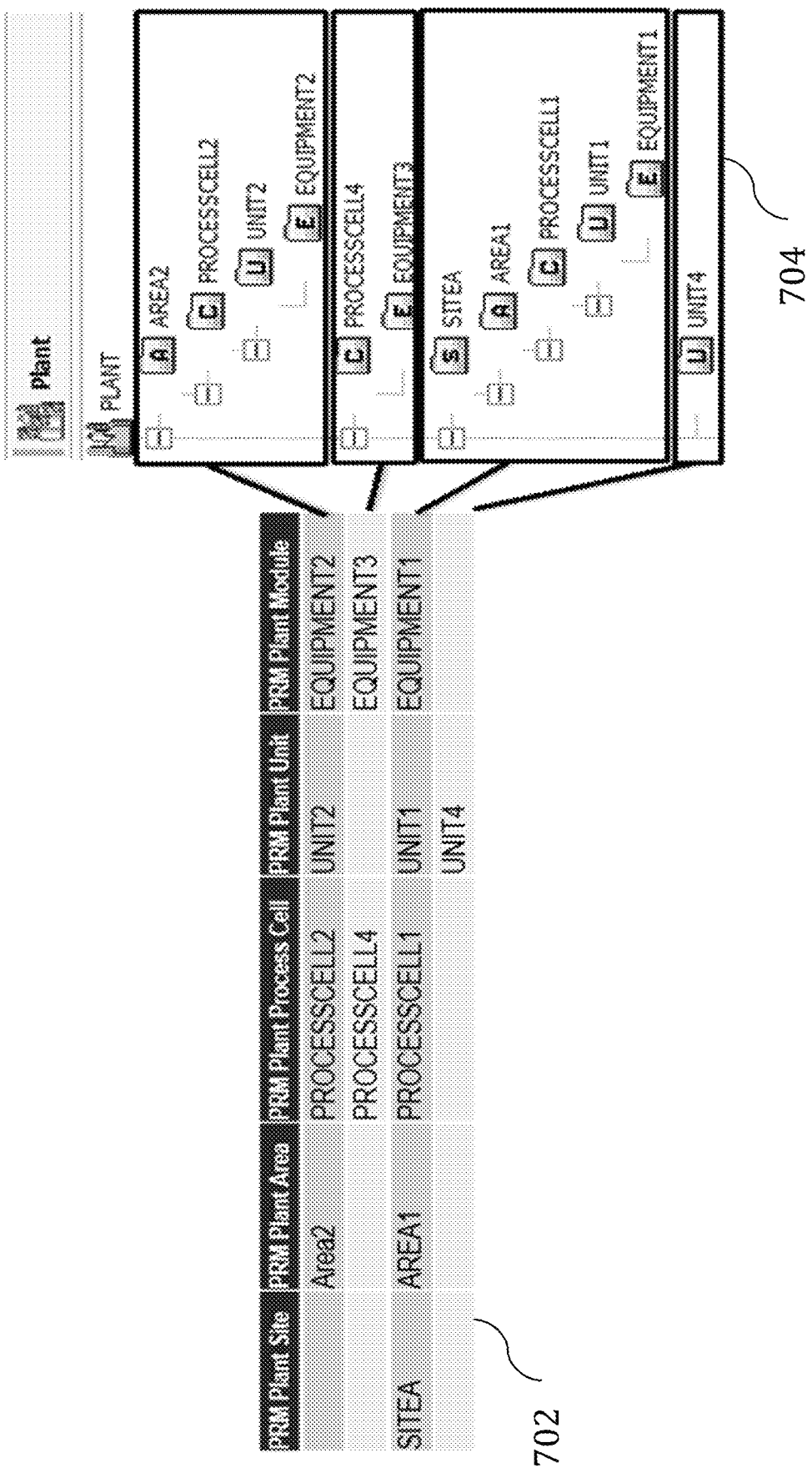
FIG. 7 illustrates an example of a plant hierarchy as described or defined in a database record, and an illustration of the plant hierarchy that is described or defined by the database record.

Step 608b comprises associating the field device (and/or its unique device identifier which has been associated with the pre-stored device configuration information at step 606b) with a plant hierarchy. FIG. 7 illustrates an example of a plant hierarchy as described or defined in a database record 702 (in the illustrated example, database record 702 is an excel file record), and an illustration of the corresponding plant hierarchy 704 that is described or defined by database record 702. As depicted in FIG. 7, when a field device has plant hierarchy information corresponding thereto, for instance, a field device belongs to Site A, Area 1, Cell 1, Unit 1 and Equipment 1 and this information is available to the plant resource manager platform, then its plant hierarchy specified in corresponding database record 702 will be set up to the level of Equipment (i.e. immediate parent) in the plant resource management platform. By the same token, if another field device belongs to Area 2, Cell 2, Unit 2 and Equipment 2, and this information is available to the plant resource manager platform, then the plant hierarchy of this device will be created till the level of Equipment (i.e. immediate parent) in the plant resource management platform.

Step 610 comprises generating a device configuration data record corresponding to the identified field device, and the device configuration data record comprises the retrieved pre-stored device configuration information, the unique device identifier and the associated plant hierarchy and/or network view in the plant resource management platform.

In an embodiment of the method of FIG. 6B, if during implementation of step 608b for a specific field device, it is found that plant hierarchy information that is available to the plant resource management platform for that field device does not actually exist (or conflicts with actual plant hierarchy information), then that particular field device will not be associated with any plant hierarchy in the plant resource management platform. In another embodiment, if a field device has already been associated with a plant hierarchy, and during implementation of step 608b for a specific field device, it is found that the plant hierarchy information that is specified in the corresponding plant hierarchy database record does not exist (or conflicts with actual plant hierarchy information) within the plant resource management platform, the field device may be re-associated and updated based on the new or correct plant hierarchy information.

In another embodiment of the method of FIG. 6B, implementing step 608b comprises further associating the field device which has been associated with the pre-stored device configuration information (at step 606b) with the plant hierarchy and/or the network view. For the purposes of associating a field device with the network view, all fields or parameters pertaining to the device path associated with the field device require to be specified, either within an imported device file (i.e. an imported or retrieved database record having device information corresponding to the field device) or by way of user inputs received from an operator terminal. Specifically, the fields retrieved from the device file or through user inputs, for establishing a device path, may include information regarding engineering project, FCS/SCS (Field Control Station/Safety Control Station), Node, IOM (Input/Output Module), Unit, Slot, and channel corresponding to the field device. In specific embodiments, responsive to determining that at least one of the required types of information for establishing a device path is not contained in the device file or is not received through the requisite user inputs, a device path or a network view will not be created for that field device.

In certain embodiments of the invention, if a unique device identifier (e.g. device tag) is detected within an imported device file (i.e. an imported or retrieved database record having device information corresponding to the field device), and the unique device identifier does not match with any existing device identifiers within the plant resource management system, the field device to which detected unique device identifier corresponds, shall be registered offline or communicably coupled with the plant resource management platform.

Table 4 read with the description provided immediately below, illustrates various criteria and method steps that may be applied when communicably coupling a field device with the plant resource management system.

TABLE 4

| If Platform Resource Management Server (PRM Server) detects the imported device with a . . . | PRM Server assumes that the imported device is . . . |
|---|---|

TABLE 4-continued

| | |
|---|---|
| device tag that does not match any existing records in the database | a new device, and registers a new device record for the device. |
| Device tag matching an existing manually registered device record in the database | the same manually registered device. The existing device record on the database is then updated based on the new information read. All the information given except device tag will be updated.<br>Note: If the VMR (Vendor, Model, Revision) of the device is changed then PRM Server will perform read device details on that device again. VMR could also be referred to as Device Manufacturer ID, Device Type ID, Device Revision, respectively. |
| Device tag matching an existing online registered device record in the database | the same as the online registered device. PRM Server will skip manual registration of the same device. |

Specifically, when a unique device identifier (e.g. device tag) is detected in a device configuration data record that is retrieved and read, and it does not match with any existing device identifiers in the plant resource management system, then the field device to which the unique device identifier corresponds will be registered as "offline"—which offline registration is a precursor (or advance step) to the field device being actually communicably coupled with the plant resource management platform. The term "registered offline" and/or "offline registration" shall be understood to refer to a situation where a field device has been configured within, or provisioned for, the plant resource management platform, but the physical field device itself has not yet been communicably coupled with the plant resource management platform.

If a unique device identifier (e.g. device tag) is detected in a device configuration data record that is received and read, and it matches with any existing unique device identifier, which corresponds to a field device that has already been registered using the offline registration process described above, then, the field device to which the unique device identifier detected within the device configuration data record corresponds will be recognized as the same offline registered device.

If a unique device identifier (e.g. device tag) is detected in a device configuration data record that is received and read, and it matches with any existing device identifier which belongs to an online registered device, that field device to which the imported unique device identifier corresponds will not be registered or communicably coupled with the plant resource management platform—since the field device is already online. The term "online device" shall be understood as referring to a field device that is already configured within the plant resource management platform, and which field device is also physically connected or communicably coupled with the plant resource management platform.

Figure 8:
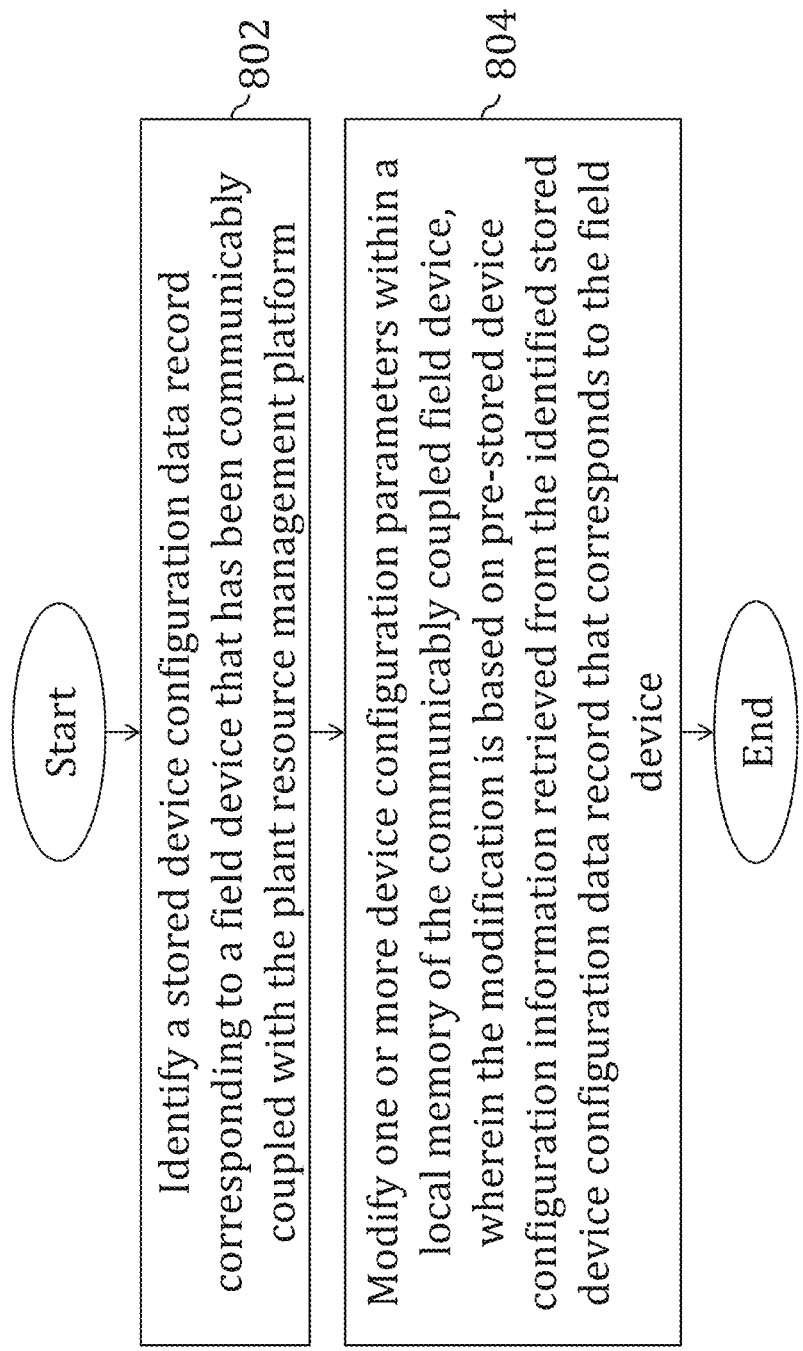
FIG. 8 is a flowchart illustrating a method of modifying device configuration parameters within a local memory of a field device, in accordance with the present invention.

FIG. 8 is a flowchart illustrating a method of modifying device configuration parameters within a local memory of a field device, in accordance with the present invention. In an embodiment, the method of FIG. 8 is implemented as part of method step 408 from FIG. 4. The method of FIG. 8 may be implemented through a plant resource management platform that is positioned as a communication intermediate between an operator terminal and field devices within a plant facility. In an embodiment, the method of FIG. 8 may be implemented through one or more plant resource management servers within a plant resource management platform. The method of FIG. 8 may be implemented in response to communicable coupling of a field device with the plant resource management platform.

Step 802 comprises identifying a previously stored device configuration data record corresponding to a field device that has been communicably coupled with the plant resource management platform. The previously stored configuration data record corresponding to a field device may be identified by parsing a unique device identifier corresponding to the field device from a local memory of the field device, and thereafter locating a previously stored configuration data record that is associated with the parsed unique device identifier.

In a particular embodiment, data within the identified previously stored configuration data record includes a pre-stored device identifier that matches or corresponds to the unique device identifier that has been parsed from the local memory of the field device. In a more particular embodiment, (i) the identified previously stored configuration data record is a device configuration data record that has been generated in accordance with method step 404 of FIG. 4 or method step 608a of FIG. 6A or method step 610b of FIG. 6B, and/or (ii) the pre-stored device identifier within the identified previously stored device configuration data record is a unique device identifier that has been included within the previously stored device configuration data record in accordance with method step 404 of FIG. 4 or method step 608a of FIG. 6A or method step 610b of FIG. 6B.

Step 804 comprises modifying one or more device configuration parameters within the local memory of the field device. The modification of device configuration parameters within the local memory of the communicably coupled field device may, in an embodiment, be based on pre-stored device configuration information retrieved from the previously stored device configuration that corresponds to the field device—and which has been identified in accordance with step 802.

Modifying the local memory of the field device at step 804 comprises updating a memory state within the local memory of such field device, and in a particular embodiment comprises recording within the local memory, one or more device configuration parameters retrieved from the device configuration data record corresponding to the field device. In an embodiment, the one or more device configuration parameters that are recorded within the local memory of the field device may include any parameters that control the operation(s), functions(s), sensitivity, alarm limits, or selectable states of the identified device-class.

Figure 9:
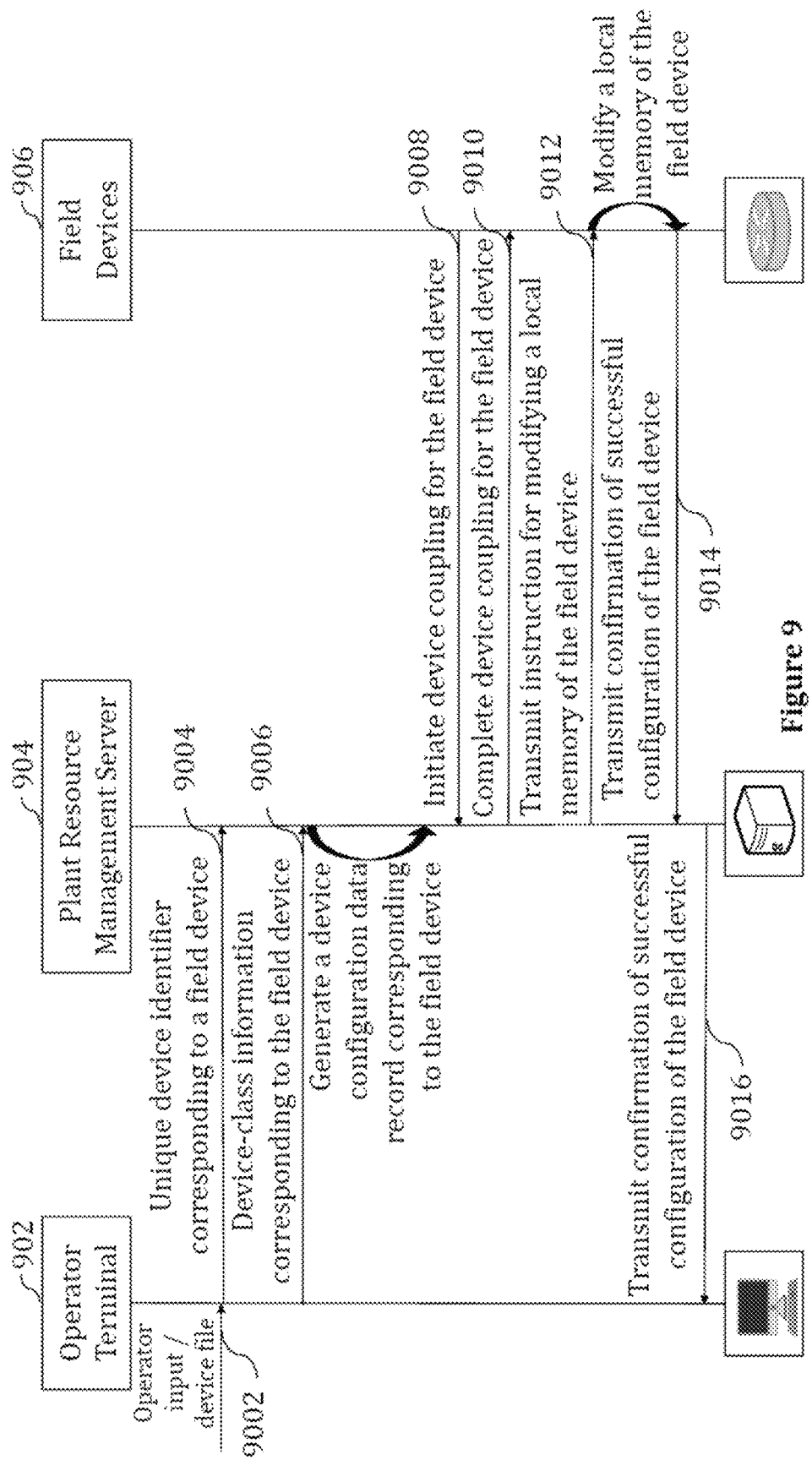
FIG. 9 is a communication flow diagram illustrating communication flow between system entities, when implementing the method of FIG. 4.

FIG. 9 is a communication flow diagram illustrating communication flow between system entities, when implementing the method of FIG. 4. The system entities involved in the illustrated communication flow are operator terminal 902, plant resource management server 904 and one or more field devices 906. Plant resource management server 904 is positioned as a communication intermediate between operator terminal 902 and field device 906 within a plant facility. In an embodiment, plant resource management server 904 is a server within a plant resource management platform that is positioned as a communication intermediate between operator terminal 902 and field device 906 within a plant facility.

While the communication flow of FIG. 9 can be implemented for a single field device 906, it would also be understood that the communication flow could similarly be used to implement the method of FIG. 4 in respect of a plurality of field devices (simultaneously or otherwise).

Step 9002 comprises receiving at operator terminal 902, input information by way of operator inputs and/or a device information file—wherein the received inputs include information that includes, or enables retrieval of, device identity information corresponding to field device(s) 906 that is intended to be communicably coupled with plant resource management server 904. Device identity information extracted from or retrieved based on the received inputs includes at least (i) a unique device identifier corresponding to field device(s) 906 and (ii) device-class information corresponding to field device(s) 906.

The unique device identifier comprises information that uniquely identifies field device(s) 906. The unique device identifier may comprise any unique hardware or software device identifier that is uniquely associated with a field device 906. In a specific embodiment, the unique device identifier(s) received at step 9002 comprises a unique device tag for a field device 906.

The device-class information received at step 9002, corresponding to field device 906 comprises information that describes device identity-related information of the field device 906. In various embodiments, the device-class information may include (i) information identifying a vendor of the field device 906—for example, manufacturer identification information for the field device 906, (ii) information identifying a model to which the field device 906 corresponds, and (iii) information identifying a revision to which the field device 906 corresponds.

Step 9004 comprises transmitting the unique device identifier corresponding to a field device 906 received from the operator terminal 902 to the plant resource management server 904. Step 9006 comprises transmitting the device-class information corresponding to a field device 906 from the operator terminal 902 to the plant resource management server 904.

Plant resource management server 904 thereafter generates a device configuration data record corresponding to field device 906. It will be understood that generation of a device configuration data record by plant resource management server 904 may involve any of method step 404 of FIG. 4, method steps 502 to 506 of FIG. 5, method steps 602a to 608a of FIG. 6A and/or method steps 602b to 610b of FIG. 6B.

Steps 9008 and 9010 comprise reciprocal communications between field device 906 and plant resource management server 904 for the purpose of communicatively coupling field device 906 with plant resource management server 904. In an embodiment, step 9008 comprises transmitting of a handshake communication from field device 906 to plant resource management server 904 initiating communicative coupling of field device 906 with plant resource management server 904. In an embodiment, step 9010 comprises transmitting of a confirmation communication from plant resource management server 904 to field device 906 for completing the communicative coupling of field device 906 with plant resource management server 904.

At step 9012, responsive to successful communicative coupling of a field device 906 with plant resource management server 904, the plant resource management server transmits to field device 906, an instruction for modifying a local memory of field device 906. Field device 906 responds to receiving the instruction transmitted at step 9012 by (i) modifying a local memory of the field device 906, and (ii) at step 9014, transmitting to plant resource management server 904, confirmation that field device 906 has been successfully configured based on the received instruction for modifying a local memory of the field device 906.

It will be understood that one or more of the steps of (i) transmitting an instruction for modifying a local memory of field device 906 (at step 9012), (ii) modifying a local memory of field device 906, and (iii) transmitting confirmation of successful configuration of field device 906 (at step 9014)—may be implemented in accordance with method step 408 of FIG. 4, and/or method steps 802 to 804 of FIG. 8.

At step 9016, plant resource management server 904 transmits to operator terminal 902, confirmation of successful configuration of field device 906.

Figure 10:
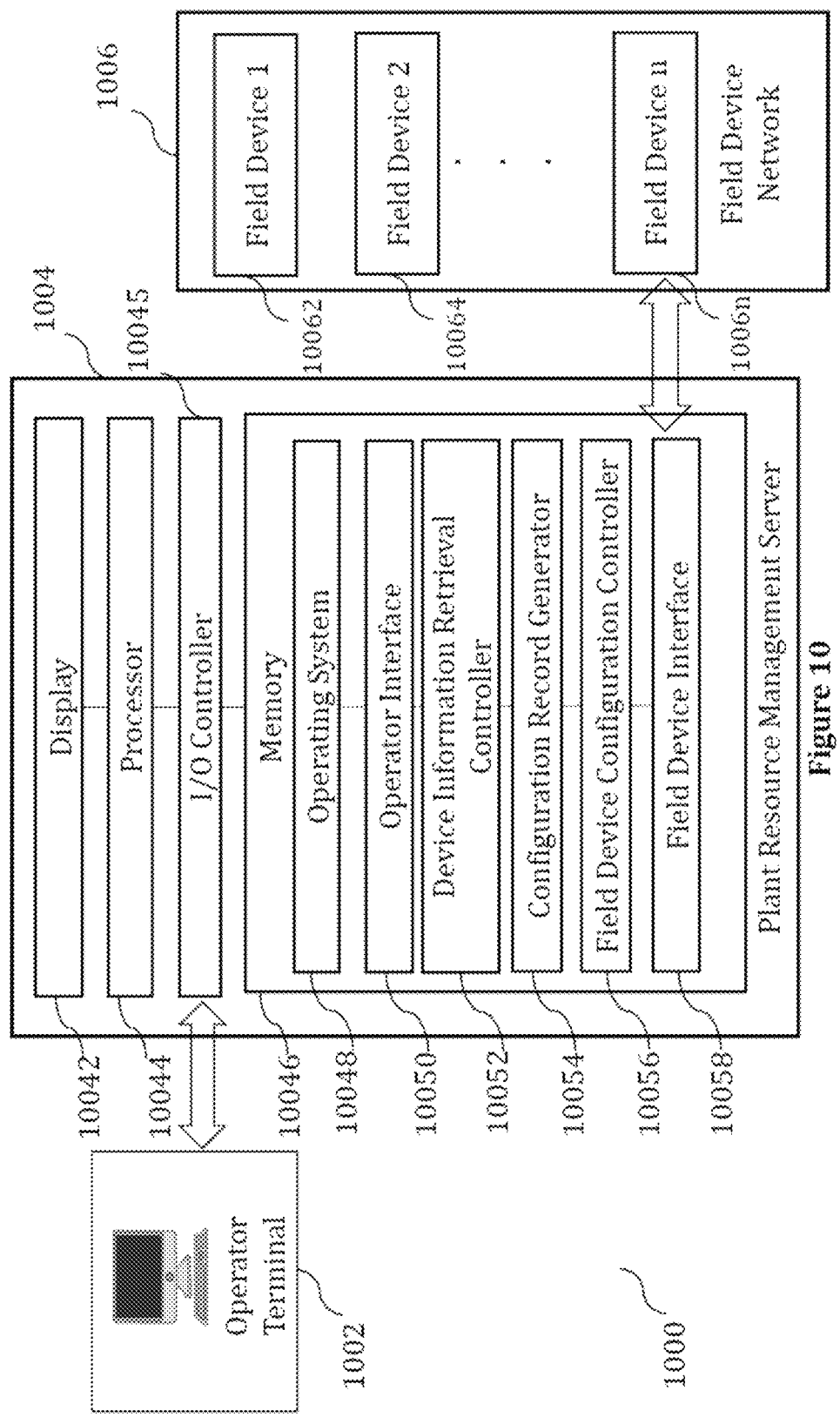
FIG. 10 illustrates a process control environment configured in accordance with the teachings of the present invention.

FIG. 10 illustrates a process control environment configured in accordance with the teachings of the present invention. Process control environment 1000 comprises operator terminal 1002, plant resource management server 1004 and field device network 1006.

Operator terminal 1002 comprises any processor implemented terminal device or client device communicably coupled with plant resource management server 1004, and that is configured to enable an operator to transmit instructions to and receive data from plant resource management server 1004.

Field device network 1006 comprises a plurality of field devices communicably coupled with plant resource management server 1004. In FIG. 10, field device network 1006 comprises field device 1 (10062), field device 2 (10064) up to field device n (1006n). Field devices 10062 up to 1006n within field device network 1006 may include any of valves, valve actuators, switches, transmitters, or other sensor devices that may be located within an industrial process environment, and that may be configured for physical or process control functions.

Figure 1:
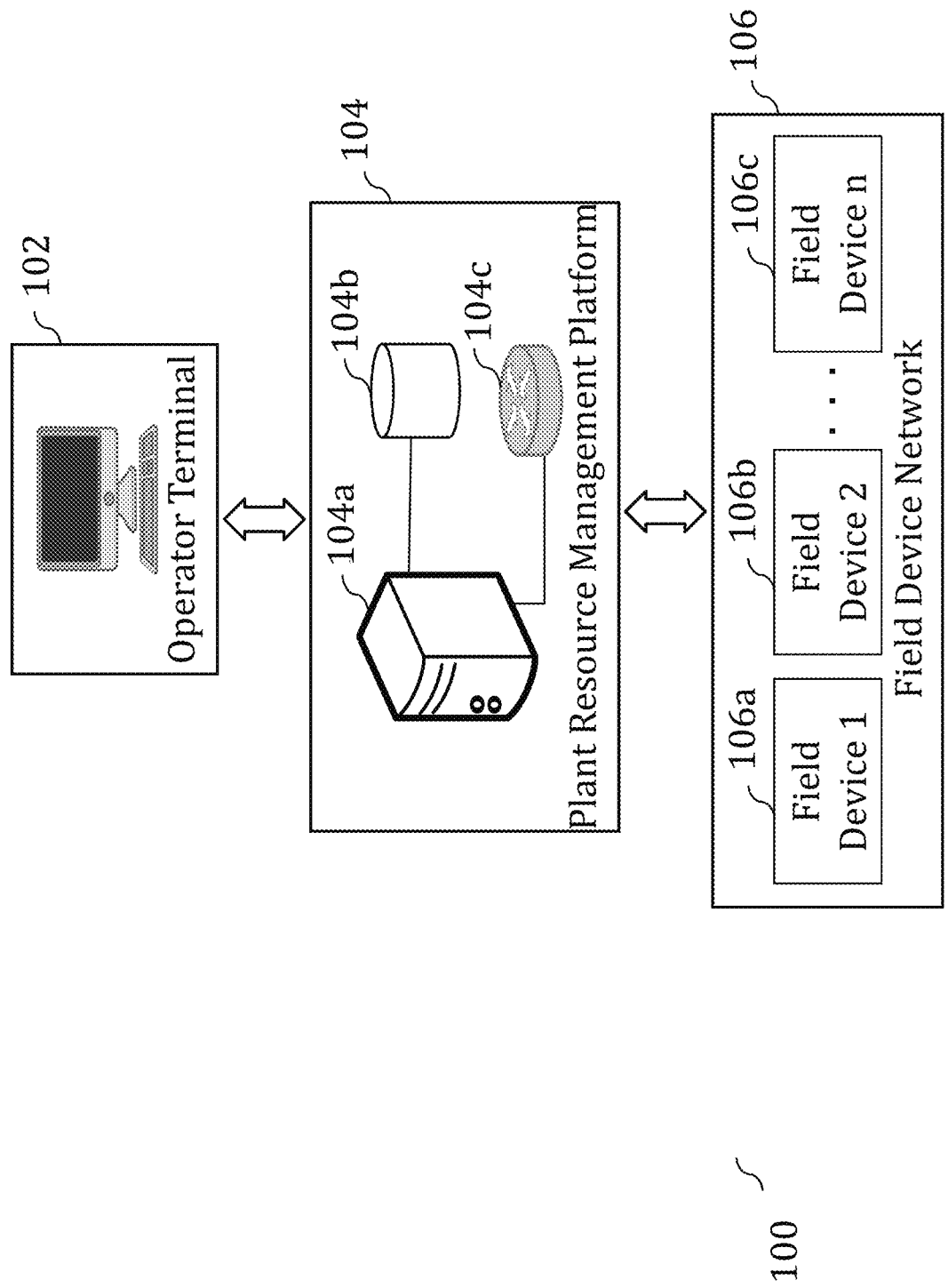
FIG. 1 illustrates a distributed process control system 100 of a type that may be used for process control within an industrial environment.

Plant resource management server 1004 comprises a server implemented as a communication intermediary between operator terminal 1002 and field device network 1006. In an embodiment, plant resource management server 1004 may be located within a plant resource management platform of a type illustrated in FIG. 1.

Plant resource management server 1004 may include (i) a display 10042, (ii) a processor 10044 configured for data processing operations within plant resource management server 1004, (iii) an I/O controller 10045 configured to enable input-output functionality associated with plant resource management server 1004, and (iv) a memory 10046, which memory 10046 include transitory memory and/or non-transitory memory.

In an embodiment, memory 10046 may have stored therewithin, (i) an operating system 10048 configured for managing device hardware and software resources and that provides common services for software programs implemented within plant resource management server 1004, (ii) an operator interface 10050 configured to enable an operator to configure or control plant resource management server 1004, (iii) a device information retrieval controller 10052 configured to retrieve device configuration information corresponding to an identified device-class in accordance with the method steps of FIG. 6A or 6B, (iv) a configuration record generator 10054 configured for generating device configuration data records corresponding to field devices, in accordance with any of method step 404 of FIG. 4, method steps 602a to 608a of FIG. 6A, and/or method steps 602b to 610b of FIG. 6B, (v) a field device configuration controller 10056 configured for configuring one or more field devices (10062 to 1006n) within field device network 1006 according to any of method step 408 of FIG. 4, and method steps 802 to 804 of FIG. 8, and (vi) a field device interface 10058 configured to enable data communication and control communications between plant resource management server 1904 and field device network 1006 and/or individual field devices 10062 to 1006n therewithin.

Figure 11:
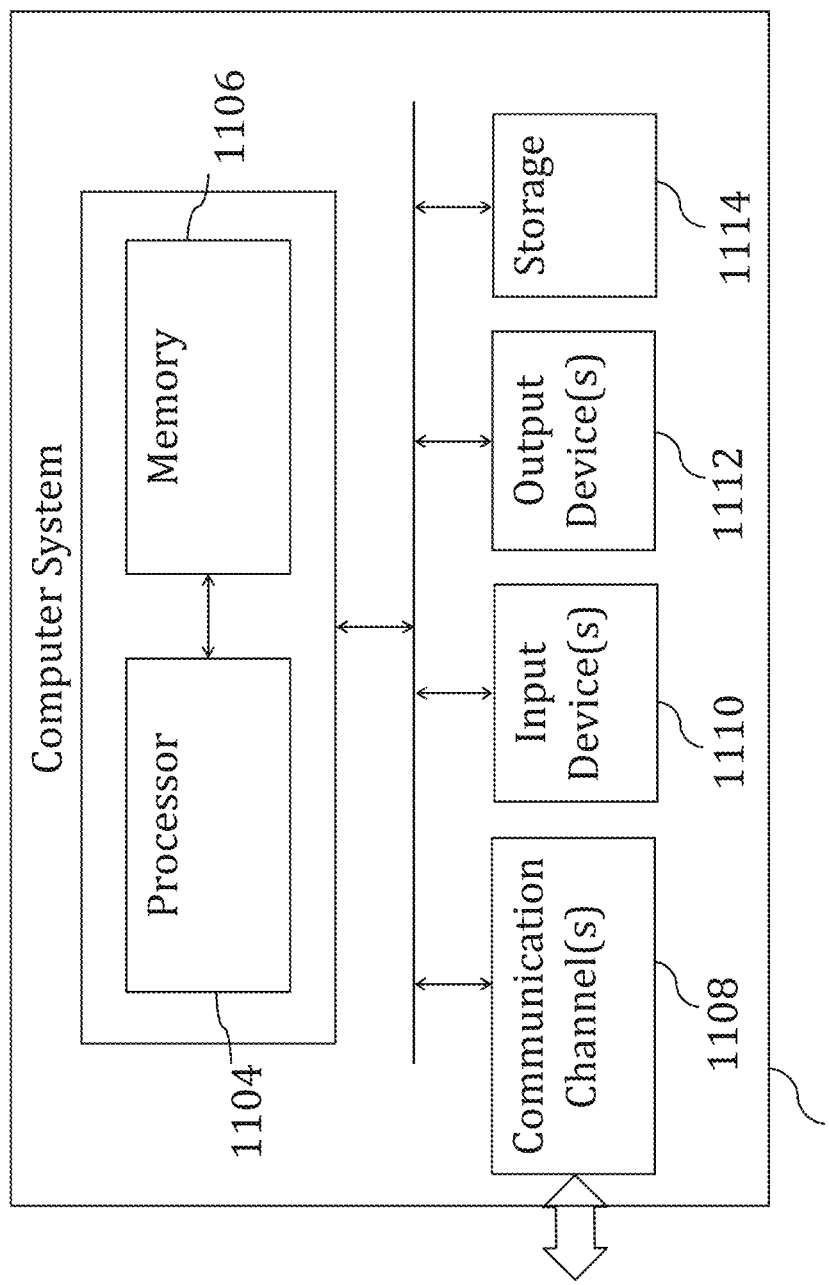
FIG. 11 illustrates an exemplary computer system according to which various embodiments of the present invention may be implemented.

FIG. 11 illustrates an exemplary computer system according to which various embodiments of the present invention may be implemented.

System 1100 includes computer system 1102 which in turn comprises one or more processors 1104 and at least one memory 1106. Processor 1104 is configured to execute program instructions—and may be a real processor or a virtual processor. It will be understood that computer system 1102 does not suggest any limitation as to scope of use or functionality of described embodiments. The computer system 1102 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1102 in accordance with the present invention may include one or more servers, desktops, laptops, tablets, smart phones, mobile phones, mobile communication devices, tablets, phablets and personal digital assistants. In an embodiment of the present invention, the memory 1106 may store software for implementing various embodiments of the present invention. The computer system 1102 may have additional components. For example, the computer system 1102 may include one or more communication channels 1108, one or more input devices 1110, one or more output devices 1112, and storage 1114. An interconnection mechanism (not shown) such as a bus, controller, or network, interconnects the components of the computer system 1102. In various embodiments of the present invention, operating system software (not shown) provides an operating environment for various softwares executing in the computer system 1102 using a processor 1104, and manages different functionalities of the components of the computer system 1102.

The communication channel(s) 1108 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1110 may include, but is not limited to, a touch screen, a keyboard, mouse, pen, joystick, trackball, a voice device, a scanning device, or any another device that is capable of providing input to the computer system 1102. In an embodiment of the present invention, the input device(s) 1110 may be a sound card or similar device that accepts audio input in analog or digital form. The output device(s) 1112 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1102.

The storage 1114 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1102. In various embodiments of the present invention, the storage 1114 may contain program instructions for implementing any of the described embodiments.

In an embodiment of the present invention, the computer system 1102 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1102. The method described herein is typically implemented as a computer program product, comprising a set of program instructions that is executed by the computer system 1102 or any other similar device. The set of program instructions may be a series of computer readable codes stored on a tangible medium, such as a computer readable storage medium (storage 1114), for example, diskette, CD-ROM, ROM, flash drives or hard disk, or transmittable to the computer system 1102, via a modem or other interface device, over either a tangible medium, including but not limited to optical or analogue communications channel(s) 1108. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages. In particular, the invention enables automatic or bulk configuration of a plurality of field devices. The invention achieves this by (i) enabling generation and retrievable storage of software objects (for example device configuration data records) that include device configuration parameters corresponding to field devices that are intended to be coupled with a plant resource management platform, and (ii) responding to detection of one or more events where such field devices are communicably coupled with a plant resource management platform, by retrieving device configuration parameters from such previously generated software objects (for example device configuration data records), and configuring the now communicably coupled field devices based on the retrieved device configuration parameters. As a result, the invention enables the steps of manufacture and installation of field devices to proceed in parallel with the process of setting up and configuring a plant resource management platform, and/or software systems and/or control systems for field devices—and for configurations that have been generated for field devices prior to installation, to be automatically applied to the intended field devices once the field devices are communicably coupled with a plant resource management platform.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for configuring a plant resource management system, for monitoring or controlling a plurality of field devices, the method comprising:
    receiving device identity information corresponding to a plurality of field devices that are intended to be communicably coupled with the plant resource management system, wherein the received device identity information includes, for each field device within the plurality of field devices:
        a unique first device identifier corresponding to the field device; and
        device-class information corresponding to the field device;
    for each field device within the plurality of field devices, generating and storing a device configuration data record, wherein generating the device configuration data record comprises:
        identifying a device-class for the field device, wherein the identification is based on the received device-class information corresponding to the field device;
        retrieving pre-stored device configuration information associated with the identified device-class;
        associating the retrieved pre-stored device configuration information with the unique first device identifier corresponding to the field device;
        generating a data record comprising the retrieved pre-stored device configuration information and the associated unique first device identifier corresponding to the field device;
    communicably coupling the plurality of field devices with the plant resource management system; and
    for each field device within the communicably coupled plurality of field devices:
        identifying a stored device configuration data record corresponding to the field device; and
        modifying within a local memory of the field device, one or more device configuration parameters corresponding to the field device, wherein the modification is based on pre-stored device configuration information retrieved from the identified stored device configuration data record corresponding to the field device; further wherein:
    generating and storing a device configuration data record corresponding to at least one field device within the plurality of field devices includes receiving plant hierarchy information corresponding to such field device, said plant hierarchy information describing a position or location of such field device within a hierarchical control structure implemented by the plant resource management platform; and
    responsive to determining that the received plant hierarchy information corresponding to such field device is inconsistent with a plant hierarchy that has been implemented by the plant resource management platform, the device configuration data record corresponding to such field device is generated without associating the received plant hierarchy information with the unique first device identifier corresponding to such field device.

2. The method as claimed in claim 1, wherein the unique first device identifier corresponding to the field device is a unique device tag.

3. The method as claimed in claim 1, wherein the device-class information corresponding to the field device includes vendor identifier information, model identifier information and revision identifier information.

4. The method as claimed in claim 3, wherein identification of the device-class for the field device is based on the received vendor identifier information, model identifier information and revision identifier information.

5. The method as claimed in claim 1, wherein each generated device configuration data record is stored in a database communicably coupled with the plant resource management system.

6. The method as claimed in claim 1, wherein the pre-stored device configuration information for each field device includes one or more device configuration parameters and their respective parameter values corresponding to said field device.

7. The method as claimed in claim 1, wherein identifying a stored device configuration data record corresponding to a field device within the communicably coupled plurality of field devices comprises:
    retrieving from a local memory of the field device, a unique second device identifier corresponding to the field device; and
    identifying based on the unique second device identifier, a stored device configuration data record.

8. The method as claimed in claim 7, wherein the unique second device identifier corresponding to the field device is identical to the unique first device identifier within the identified stored device configuration data record.

9. The method as claimed in claim 1, wherein generating and storing the device configuration data record corresponding to the at least one field device within the plurality of field devices includes the step of associating the received plant hierarchy information with the unique first device identifier corresponding to such field device.

10. The method as claimed in claim 1, wherein responsive to determining that the unique first device identifier corresponding to the field device within the plurality of field devices is associated with incorrect plant hierarchy information, re-associating the unique first device identifier corresponding to the field device with correct plant hierarchy information.

11. The method as claimed in claim 1, wherein generating and storing a device configuration data record corresponding to at least one field device within the plurality of field devices includes the step of receiving network view information corresponding to such field device, said network view information describing physical location of the field device within the network or corresponding to a device path associated with such field device.

12. The method as claimed in claim 11, wherein the network view information includes information corresponding to any one or more of engineering project, field control station, safety control station, node, input/output module, unit, slot and channel corresponding to the field device.

13. A plant resource management system, configured for monitoring or controlling a plurality of field devices, the plant resource management system comprising:
    a plant resource management server configured to:
        receive device identity information corresponding to a plurality of field devices that are intended to be communicably coupled with the plant resource management server, wherein the received device identity information includes, for each field device within the plurality of field devices:
  a unique first device identifier corresponding to the field device; and
  device-class information corresponding to the field device;
generate and store for each field device within the plurality of field devices, a device configuration data record, wherein generating the device configuration data record comprises:
  identifying a device-class for the field device, wherein the identification is based on the received device-class information corresponding to the field device;
  retrieving pre-stored device configuration information associated with the identified device-class;
  associating the retrieved pre-stored device configuration information with the unique first device identifier corresponding to the field device; and
  generating a data record comprising the retrieved pre-stored device configuration information and the associated unique first device identifier corresponding to the field device;
communicably connect with the plurality of field devices; and
for each field device within the communicably connected plurality of field devices:
  identify a stored device configuration data record corresponding to the field device; and
  modify within a local memory of the field device, one or more device configuration parameters corresponding to the field device, wherein the modification is based on pre-stored device configuration information retrieved from the identified stored device configuration data record corresponding to the field device; further wherein:
generating and storing a device configuration data record corresponding to at least one field device within the plurality of field devices includes receiving plant hierarchy information corresponding to such field device, said plant hierarchy information describing a position or location of such field device within a hierarchical control structure implemented by the plant resource management platform; and
responsive to determining that the received plant hierarchy information corresponding to such field device is inconsistent with a plant hierarchy that has been implemented by the plant resource management platform, the device configuration data record corresponding to such field device is generated without associating the received plant hierarchy information with the unique first device identifier corresponding to such field device.

14. The system as claimed in claim 13, configured such that the unique first device identifier corresponding to the field device is a unique device tag.

15. The system as claimed in claim 13, configured such that the device-class information corresponding to the field device includes vendor identifier information, model identifier information and revision identifier information.

16. The system as claimed in claim 15, configured such that identification of the device-class for the field device is based on the received vendor identifier information, model identifier information and revision identifier information.

17. The system as claimed in claim 13, configured such that each generated device configuration data record is stored in a database communicably coupled with the plant resource management system.

18. The system as claimed in claim 13, configured such that the pre-stored device configuration information for each field device includes one or more device configuration parameters and their respective parameter values corresponding to said field device.

19. The system as claimed in claim 13, configured such that identifying a stored device configuration data record corresponding to a field device within the communicably coupled plurality of field devices comprises:
  retrieving from a local memory of the field device, a unique second device identifier corresponding to the field device; and
  identifying based on the unique second device identifier, a stored device configuration data record.

20. The system as claimed in claim 19, configured such that the unique second device identifier corresponding to the field device is identical to the unique first device identifier within the identified stored device configuration data record.

21. The system as claimed in claim 13, configured such that generating and storing the device configuration data record corresponding to the at least one field device within the plurality of field devices includes the step of associating the received plant hierarchy information with the unique first device identifier corresponding to such field device.

22. The system as claimed in claim 13, configured such that responsive to determining that the unique first device identifier corresponding to the field device within the plurality of field devices is associated with incorrect plant hierarchy information, re-associating the unique first device identifier corresponding to the field device with correct plant hierarchy information.

23. The system as claimed in claim 13, configured such that generating and storing a device configuration data record corresponding to at least one field device within the plurality of field devices includes the step of receiving network view information corresponding to such field device, said network view information describing physical location of the field device within the network or corresponding to a device path associated with such field device.

24. The system as claimed in claim 23, configured such that the network view information includes information corresponding to any one or more of engineering project, field control station, safety control station, node, input/output module, unit, slot and channel corresponding to the field device.

25. A computer program product for configuring a plant resource management system, for monitoring or controlling a plurality of field devices, the computer program product comprising a non-transitory computer usable medium having a computer readable program code embodied therein, the computer readable program code comprising instructions for implementing within a processor based computing system, the following:
  receiving device identity information corresponding to a plurality of field devices that are intended to be communicably coupled with the plant resource management system, wherein the received device identity information includes, for each field device within the plurality of field devices:

a unique first device identifier corresponding to the field device; and device-class information corresponding to the field device;

identifying a device-class for a field device within the plurality of field devices, wherein the identification of the device-class for the field device is based on the received device-class information corresponding to the field device, and wherein the field device corresponds to an offline registered device;

retrieving pre-stored device configuration information associated with the identified device-class;

associating the retrieved pre-stored device configuration information with the unique first device identifier corresponding to the field device;

generating a data record comprising the retrieved pre-stored device configuration information and the associated unique first device identifier corresponding to the field device;

communicably coupling the plurality of field devices with the plant resource management system, wherein the field device corresponding to the offline registered device is provisioned prior to the communicably coupling;

identifying a stored device configuration data record corresponding to the field device; and updating a local memory of the field device by changing at least one configuration parameter of the field device defined within the stored device configuration data with at least one new configuration parameter defined within the pre-stored device configuration information.

26. The computer program product of claim 25, wherein the at least one new configuration parameter controls one or more of an operation, a function, a sensitivity, an alarm limit, and a selectable state of the identified device-class.

* * * * *